US012690085B2

(12) United States Patent
Christoffersson et al.

(10) Patent No.: US 12,690,085 B2
(45) Date of Patent: Jul. 21, 2026

(54) CONDITIONS FOR TRANSITIONING TO OR REMAINING IN INACTIVE STATE

(71) Applicant: Telefonaktiebolaget LM Ericsson (publ), Stockholm (SE)

(72) Inventors: Jan Christoffersson, Luleå (SE); Andreas Höglund, Solna (SE); Mårten Ericson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 322 days.

(21) Appl. No.: 18/259,850

(22) PCT Filed: Jan. 2, 2021

(86) PCT No.: PCT/SE2021/050001
§ 371 (c)(1),
(2) Date: Jun. 29, 2023

(87) PCT Pub. No.: WO2022/146205
PCT Pub. Date: Jul. 7, 2022

(65) Prior Publication Data
US 2024/0080927 A1 Mar. 7, 2024

(51) Int. Cl.
*H04W 76/20* (2018.01)
*H04W 56/00* (2009.01)
*H04W 84/04* (2009.01)
(52) U.S. Cl.
CPC ....... *H04W 76/20* (2018.02); *H04W 56/0015* (2013.01); *H04W 84/042* (2013.01)

(58) Field of Classification Search
CPC ............. H04W 76/20; H04W 56/0015; H04W 84/042; H04W 76/27
See application file for complete search history.

(56) References Cited

U.S. PATENT DOCUMENTS

| | | | |
|---|---|---|---|
| 2020/0045669 A1 | 2/2020 | Hwang et al. | |
| 2022/0210798 A1* | 6/2022 | Tsai ................... | H04W 72/1263 |
| 2022/0232659 A1* | 7/2022 | Kim ..................... | H04W 76/27 |
| 2023/0102937 A1* | 3/2023 | Kim ................... | H04W 72/1268 |
| | | | 370/329 |

(Continued)

FOREIGN PATENT DOCUMENTS

WO 2020166619 A1 8/2020

OTHER PUBLICATIONS

3GPP TS 38.331 V16.3.0 (Dec. 2020), (Year: 2020).*

(Continued)

*Primary Examiner* — Mohammed S Chowdhury
(74) *Attorney, Agent, or Firm* — Weisberg I.P. Law, P.A.

(57) ABSTRACT
A wireless communication device, WCD, receives a message from a network node in a communication network. The message indicates that the WCD is to save a user equipment, UE, context of the WCD. In response to receiving the message, the WCD saves the UE context. The message also indicates that the WCD is to transition from a connected state to an inactive state when a first condition is satisfied, and/or remain in an inactive state when a second condition is satisfied. The first and/or second condition may for example include that the WCD experiences a loss of connection or loss of coverage, or that the WCD experiences a radio link failure.

17 Claims, 14 Drawing Sheets

(56) References Cited

U.S. PATENT DOCUMENTS

2023/0120096 A1* 4/2023 Kim ..................... H04W 76/19
                                                         370/329
2023/0363054 A1* 11/2023 Laselva .............. H04W 74/004

OTHER PUBLICATIONS

3GPP TSG RAN WG2 Meeting #111-e; R2-2006713; Source: Intel Corporation; Title: SDT mechanism on RRC/non-RRC based approaches and RACH requirements; Electronic meeting, Aug. 17-28, 2020. (Year: 2020).*

3GPP TSG-RAN WG2 Meeting #111e; R2-2007540; Source: Qualcomm Incorporated; Title: RACH based NR small data transmission; Online, Aug. 17-28, 2020 (Year: 2020).*

International Search Report and Written Opinion dated Sep. 6, 2021 for International Application No. PCT/SE2021/050001 filed Jan. 2, 2021, consisting of 10-pages.

3GPP TS 36.300 V16.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16); Sep. 2020, consisting of 390-pages.

3GPP TSG-RAN WG2 #106 R2-1906655; Title: Network-controlled conditional RRC release; Agenda Item: 11.11.3; Source: Kyocera; Document for: Discussion; Date and Location: May 13-17, 2019, Reno, USA, consisting of 3-pages.

3GPP TSG-RAN WG2 #108 R2-1914636; Title: Suspend/Release while monitoring CHO in NR; Agenda Item: 6.9.3.1 Conditional Handover-configuration and execution details; Source: Ericsson; Document for: Discussion and Decision; Date and Location: Nov. 18-22, 2019, Reno, Nevada, USA, consisting of 7-pages.

3GPP TSG RAN Meeting #86 RP-193252; Title: Work Item on NR smalldata transmissions in INACTIVE state; Agenda Item: 9.1.2; Source: ZTE Corporation; Document for: Approval; Date and Location: Dec. 9-12, 2019, Sitges, Spain, consisting of 4-pages.

* cited by examiner

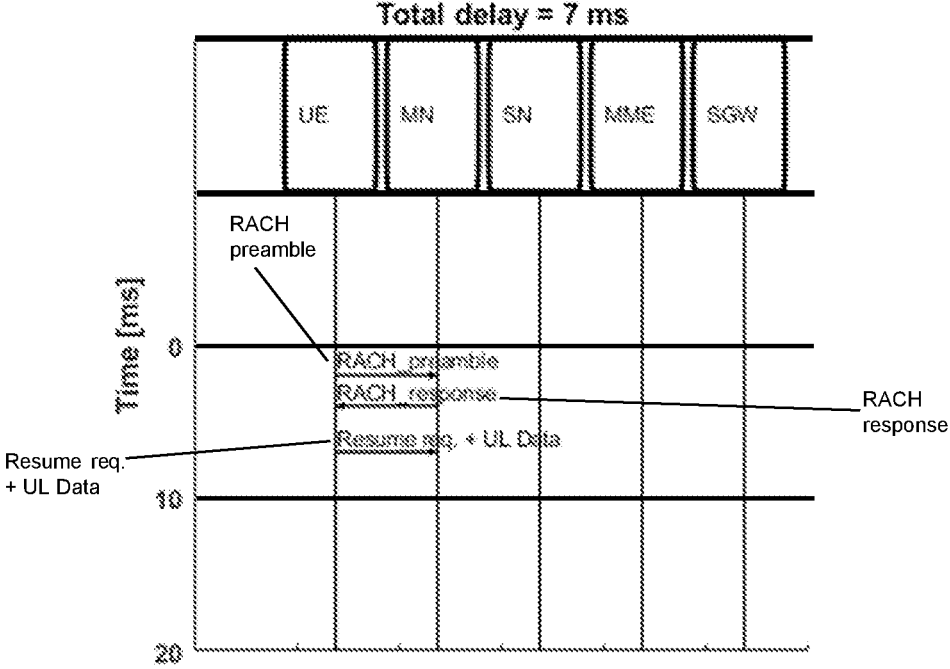

UE NR data transmission setup from NR RRC Inactive
Total delay = 7 ms

RACH preamble

Time [ms]

RACH preamble
RACH response

RACH response

Resume req. + UL Data

Resume req. + UL Data

Figure 8

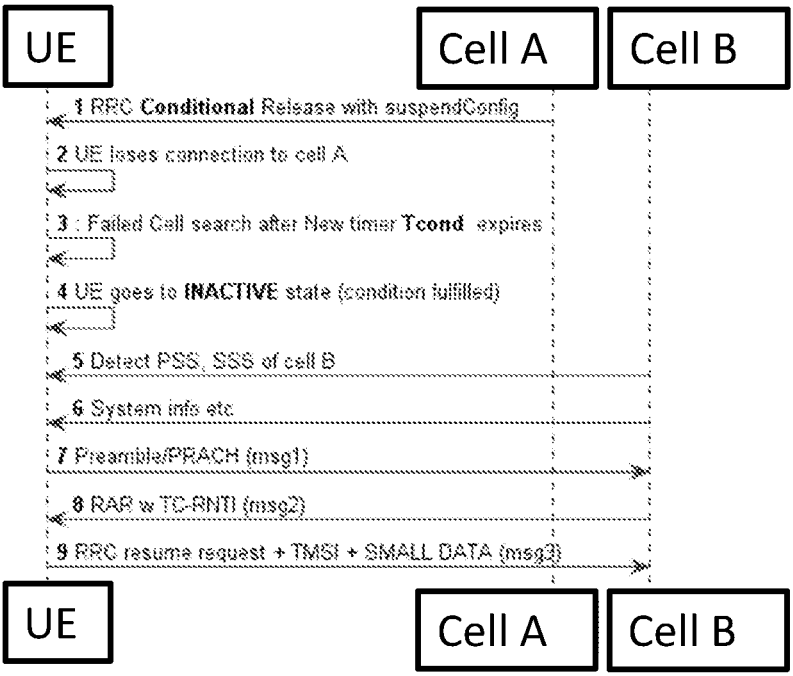

UE          Cell A    Cell B

1 RRC Conditional Release with suspendConfig

2 UE loses connection to cell A

3 : Failed Cell search after New timer Tcond expires

4 UE goes to INACTIVE state (condition fulfilled)

5 Detect PSS, SSS of cell B

6 System info etc

7 Preamble/PRACH (msg1)

8 RAR w TC-RNTI (msg2)

9 RRC resume request + TMSI + SMALL DATA (msg3)

UE          Cell A    Cell B

CONDITIONS FOR TRANSITIONING TO OR REMAINING IN INACTIVE STATE

CROSS-REFERENCE TO RELATED APPLICATIONS

This application is a Submission Under 35 U.S.C. § 371 for U.S. National Stage Patent Application of International Application Number: PCT/SE2021/050001, filed Jan. 2, 2021 entitled "CONDITIONS FOR TRANSITIONING TO OR REMAINING IN INACTIVE STATE," the entirety of which is incorporated herein by reference.

TECHNICAL FIELD

The present disclosure generally relates to wireless communication, and in particular to conditions to be applied by a wireless communication device for transitioning to or remaining in inactive state.

BACKGROUND

Even if a wireless communication device (WCD), such as a user equipment (UE), is within coverage of a cell of a communication network, the WCD may not be able to transmit data quickly to the network.

For example, the WCD may be in inactive state, and it may take some time for the WCD to transition to connected state before transmitting the data. In [1], several ideas are indicated for how a WCD may perform small data transmissions (SDT) to a new radio (NR) network in inactive state. These ideas include transmission of data in message 3 (also referred to as MSG3) in a four-step random access channel (RACH) procedure, transmission of data in message A (also referred to as MSGA) in a two-step RACH procedure, and transmission of data over configured grant type 1 resources in inactive state. Similar ideas have been introduced for Narrowband Internet of Things (NB-IoT) and Long Term Evolution Machine Type Communication (LTE-M) through third generation partnership program (3GPP) Release 15 Early Data Transmission (EDT) and 3GPP Release 16 Preconfigured Uplink Resources (PUR). More information about EDT and PUR can for example be found in 3GPP TS 36.300 version 16.3.0, where the procedures are described.

In another example, the WCD may move out of coverage of its cell and lose connection. If there is no suitable cell available for making a handover, a radio link failure (RLF) may be declared. When the WCD moves into coverage of a cell after RLF, there is typically a delay before the WCD is properly connected to the cell and/or before the WCD is able to transmit data to the cell.

It would be desirable to provide new methods and/or apparatus for allowing a WCD to connect more quickly and/or to transmit data more quickly.

SUMMARY

Embodiments of methods, WCDs, network nodes etc. are provided herein for addressing one or more of the issues indicated above.

A first aspect provides embodiments of a method at a WCD. The method comprises receiving a message from a network node in a communication network. The message indicates that the WCD is to save a UE context of the WCD. The method comprises saving the UE context of the WCD in response to receiving the message. The message also indicates that the WCD is to transition from a connected state to an inactive state when a first condition is satisfied, and/or remain in an inactive state when a second condition is satisfied.

A second aspect provides embodiments of a WCD. The WCD is configured to receive a message from a network node in a communication network. The message indicates that the WCD is to save a UE context of the WCD. The WCD is configured to save the UE context of the WCD in response to receiving the message. The message also indicates that the WCD is to transition from a connected state to an inactive state when a first condition is satisfied, and/or remain in an inactive state when a second condition is satisfied.

The WCD may for example comprise processing circuitry configured to cause the WCD to receive the message, and save the UE context of the WCD in response to receiving the message.

A third aspect provides embodiments of a method at a network node in a communication network. The method comprises transmitting a message to a WCD. The message indicates that the WCD is to save a UE context of the WCD. The method comprises saving the UE context of the WCD. The message also indicates that the WCD is to transition from a connected state to an inactive state when a first condition is satisfied, and/or remain in an inactive state when a second condition is satisfied.

A fourth aspect provides embodiments of a network node for operation in a communication network. The network node is configured to transmit a message to a WCD. The message indicates that the WCD is to save a UE context of the WCD. The network node is configured to save the UE context of the WCD. The message also indicates that the WCD is to transition from a connected state to an inactive state when a first condition is satisfied, and/or remain in an inactive state when a second condition is satisfied.

The network node may for example comprise processing circuitry configured to cause the network node to transmit the message, and save the UE context of the WCD.

As further described below in the detailed description with reference to FIGS. 3-7, traditionally, a WCD (such as a UE) transitions to idle state when it loses coverage or experiences radio link failure. This may cause a delay before the WCD is able to transmit data in the uplink, even if the WCD has moved back into coverage. If, instead of transitioning to idle state, the WCD transitions to inactive state (or remains in inactive state if it already was in inactive state) the WCD may be able to transmit data more quickly in the uplink. By saving the UE context of the WCD both at the WCD side and the network side before coverage is lost or radio link failure occurs, the UE context may for example be employed to allow the WCD to more quickly connect to the network and/or more quickly transmit data in the uplink.

BRIEF DESCRIPTION OF THE DRAWINGS

In what follows, example embodiments will be described in greater detail with reference to the accompanying drawings, on which:

FIG. 8 shows a signaling diagram and delays associated with a UE going from inactive state to connected state;

FIG. 9 shows a signaling diagram for conditional RRC suspend with small data transmission using four-step random access, according to some embodiments;

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Some of the embodiments contemplated herein will now be described more fully with reference to the accompanying drawings. Other embodiments, however, are contained within the scope of the subject-matter disclosed herein. The scope of the present disclosure should not be construed as limited to only the embodiments set forth herein. Rather, these embodiments are provided by way of example to convey the scope of the disclosed subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. It will be appreciated that the word "comprising" does not exclude other elements or steps. The word "or" is not to be interpreted as an exclusive or (sometimes referred to as "XOR"). On the contrary, expressions such as "A or B" covers all the cases "A and not B", "B and not A" and "A and B". The mere fact that certain measures are recited in mutually different dependent claims or embodiments does not indicate that a combination of these measures cannot be used to advantage. Any feature of any of the embodiments or claims disclosed herein may be applied to any other embodiment or claim, wherever appropriate. Likewise, any advantage of any of the embodiments or claims may apply to any other embodiments or claims, and vice versa. Other objectives, features and advantages of the enclosed embodiments will be apparent from the following description.

Embodiments of methods and apparatus according to the first, second, third and fourth aspects will be described below with reference to FIGS. 8-17. But first, some related concepts will be described.

Four-Step Random Access Procedure

Figure 1:
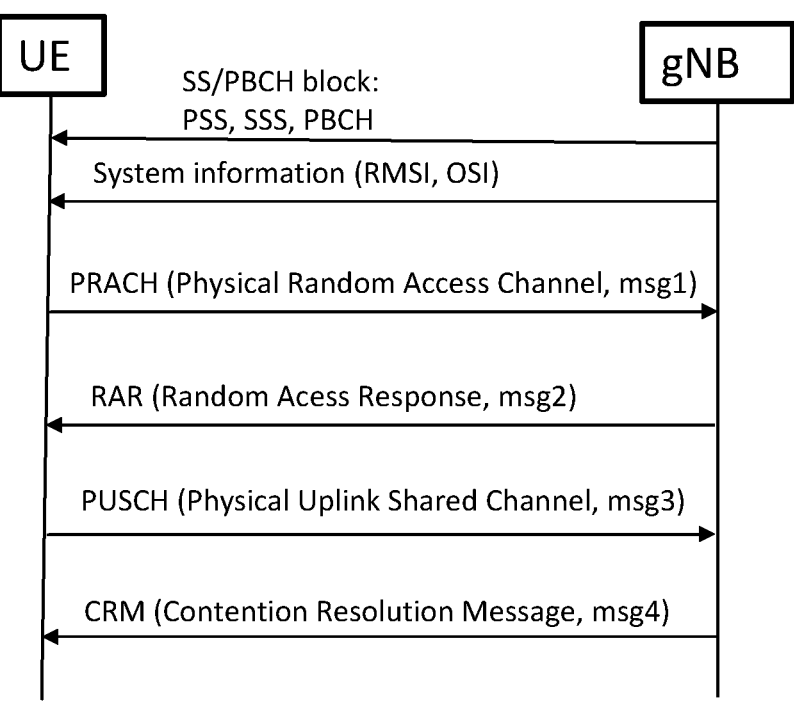
FIG. 1 shows a four-step random access procedure for initial access.

This section describes the four-step random access procedure (also referred to as 4-step RA) from New Radio (NR) release 15 (rel-15), which is illustrated in FIG. 1. In this random access (RA) procedure, the UE detects synchronization signals (SS) provided in a SS Physical Broadcast Channel (PBCH) block (SS/PBCH block, also referred to as SS block, SSB) and decodes the broadcasted system information. The UE then transmits a Physical Random Access Channel (PRACH) preamble (referred to as message 1 or msg1) in the uplink. The NR base station (gNB) replies with a Random Access Response (RAR, referred to as message 2 or msg2). The UE then transmits a UE identification on a Physical Uplink Shared Channel (PUSCH) using an uplink grant (that is, an allocation of uplink transmission resources). This scheduled PUSCH transmission is referred to as message 3 or msg3. The UE transmits message 3 (on PUSCH) after receiving a timing advance command in the RAR, allowing PUSCH to be received at the gNB with a timing accuracy within the cyclic prefix (CP). Without this timing advance, a very large CP would be needed in order for the gNB to be able to demodulate and detect PUSCH, unless the system is applied in a cell with very small distance between UE and gNB. NR is intended to support also larger cells where the timing advance needs to be provided to the UE. The four-step random access approach may for example be used in such scenarios. After receiving the message 3, the gNB transmits a Contention Resolution Message (CRM, referred to as message 4 or msg4).

In NR rel-15, the UE will indicate an SSB. The purpose of this is to let the gNB know in which direction (that is, which downlink beam to use) to transmit the RAR and subsequent messages. The SSB selection is performed by the UE by comparing the SS-reference signal received power (SS-RSRP) to a threshold (rsrp-ThresholdSSB). Once the SSB has been selected, the indication from UE to the gNB is done by selection of a preamble and/or a PRACH occasion (RO) depending on the configuration. With the use of a specific preamble and/or RO, the UE implicitly indicates the selected SSB to the gNB. In one extreme configuration, the indication is done purely by the preamble, meaning that the preamble index will indicate the SSB irrespectively on which RO it is transmitted. On the other extreme, the RO alone will indicate the SSB, irrespectively of preamble index. In a typical case, the indication will be a combination of these extremes: depending on which RO, the preamble index will indicate the SSB (in other words, a certain preamble index will indicate different SSBs depending on in which RO it is transmitted). The available number of SSBs (up to 64) will impact how the configuration of the resources is done and it can be observed that for a high number of available SSBs, indicating using only preamble identity/index is not sufficient (since preamble identity/index will be needed also for contention free RA and system information requests). When several ROs are needed to indicate SSB, the latency of the RA procedure will increase latency (alternative give a large overhead in terms of configured ROs). Hence, when the number of available SSBs is high, preambles and ROs will be a scarce resource and the RA configuration will have to balance the overhead in terms of PRACH resources with the latency and allocation of pre-ambles to other things than SSB indication.

Two-Step Random Access Procedure

Figure 2:
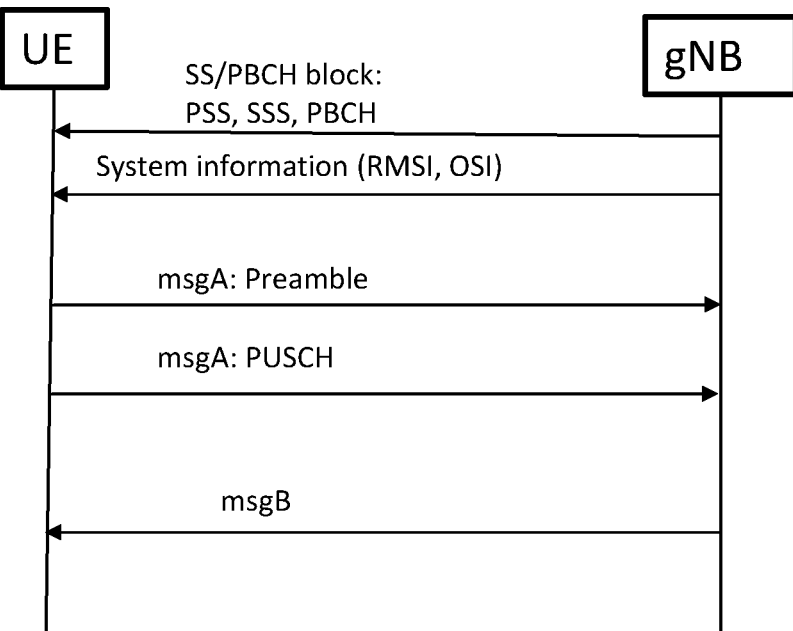
FIG. 2 shows a two-step random access procedure for initial access.

This section describes the two-step Random Access procedure (also referred to as 2-step RA) from NR release 16 (rel-16), which is illustrated in FIG. 2. In the 2-step RA procedure, the RA is completed in only two steps. In step 1, the UE sends a message A (also referred to as msgA) including a RA preamble together with higher layer data such as a radio resource control (RRC) connection request, possibly with some small payload on a PUSCH (denoted "msgA PUSCH"). In step 2, the gNB sends a response called message B or msgB (which may be described as a modified RAR) and which includes UE identifier assignment, timing advance information, and contention resolution message etc. In addition, msgB may contain a higher layer part. Similar to a RAR, a msgB may contain responses to multiple msgAs, and thus to multiple UEs, but the optional higher layer part can only pertain to one of the responses (that is, to one of the msgAs/UEs). If a response in a msgB does not have an associated higher layer part, this will be sent in a separate subsequent message, e.g. an RRC message, on the Physical Downlink Shared Channel (PDSCH).

The msgB is a response to msgA, which may contain contention resolution message(s), fallback indication(s) to schedule msg3 transmission, and backoff indication. The msgB is a response to msgA, which may contain responses to multiple UEs and with different kinds of information for different UEs depending on the outcome of the msgA transmission/reception (and the load on the access resources). Upon a successful msgA reception, the gNB includes a successRAR Medium Access Control (MAC) subPDU (sub Protocol Data Unit) as a response for the concerned UE, where the successRAR MAC subPDU includes a contention resolution identity, a timing advance and a Cell Radio Network Temporary Identifier (C-RNTI) allocation. If the gNB successfully received the RACH preamble, but failed to receive msgA PUSCH, the gNB can respond to the concerned UE with a fallbackRAR MAC subPDU in the msgB. The fallbackRAR essentially turns the 2-step RA into a 4-step RA and consequently the fallback-RAR MAC subPDU contains an UL grant, a timing advance and a temporary C-RNTI (TC-RNTI) allocation, but no contention resolution identity. The UE uses the uplink (UL) grant to retransmit msgA PUSCH in the form of msg3. In addition to successRAR and fallbackRAR MAC subPDUs, the gNB may include a parameter which is intended for the UEs that did not find any response to their respective msgA transmissions in msgB. This parameter is the Backoff Indicator (a single parameter for all UEs which did not find their expected response in the msgB), which controls whether and how much a UE must wait until it can attempt to access the network through random access again.

RRC States

In 3GPP TS 38.331 v16.2.0, section 4.2.1, the RRC states for a UE are characterized as follows:

RRC_IDLE:
  A UE specific DRX may be configured by upper layers;
  UE controlled mobility based on network configura-
    tion;
  The UE:
    Monitors Short Messages transmitted with P-RNTI
      over DCI (see clause 6.5);
    Monitors a Paging channel for CN paging using
      5G-S-TMSI;

Performs neighbouring cell measurements and cell
      (re-)selection;
    Acquires system information and can send SI request
      (if configured).
    Performs logging of available measurements
      together with location and time for logged mea-
      surement configured UEs.
  RRC_INACTIVE:
    A UE specific DRX may be configured by upper layers
      or by RRC layer;
    UE controlled mobility based on network configura-
      tion;
    The UE stores the UE Inactive AS context;
    A RAN-based notification area is configured by RRC
      layer;
  The UE:
    Monitors Short Messages transmitted with P-RNTI over
      DCI (see clause 6.5);
    Monitors a Paging channel for CN paging using 5G-S-
      TMSI and RAN paging using fulll-RNTI;
    Performs neighbouring cell measurements and cell (re-)
      selection;
    Performs RAN-based notification area updates periodi-
      cally and when moving outside the configured RAN-
      based notification area;
    Acquires system information and can send SI request (if
      configured).
    Performs logging of available measurements together
      with location and time for logged measurement con-
      figured UEs.
  RRC_CONNECTED:
    The UE stores the AS context;
    Transfer of unicast data to/from UE;
    At lower layers, the UE may be configured with a UE
      specific DRX;
    For UEs supporting CA, use of one or more SCells,
      aggregated with the SpCell, for increased bandwidth;
    For UEs supporting DC, use of one SCG, aggregated
      with the MCG, for increased bandwidth;
    Network controlled mobility within NR and to/from
      E-UTRA;
    The UE:
      Monitors Short Messages transmitted with P-RNTI
        over DCI (see clause 6.5), if configured;
      Monitors control channels associated with the shared
        data channel to determine if data is scheduled for
        it;
      Provides channel quality and feedback information;
      Performs neighbouring cell measurements and mea-
        surement reporting;
      Acquires system information;
      Performs immediate MDT measurement together
        with available location reporting.

Figure 3:
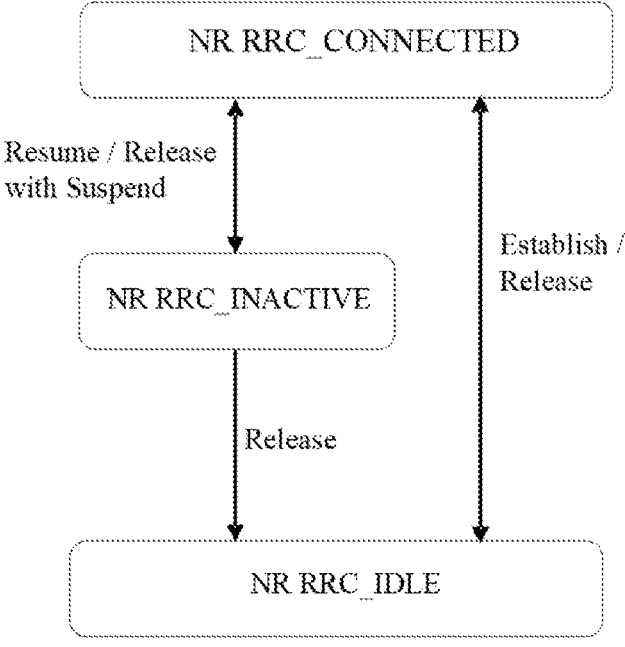
FIG. 3 shows a UE radio resource control (RRC) state machine and state transitions.
Figure 4:
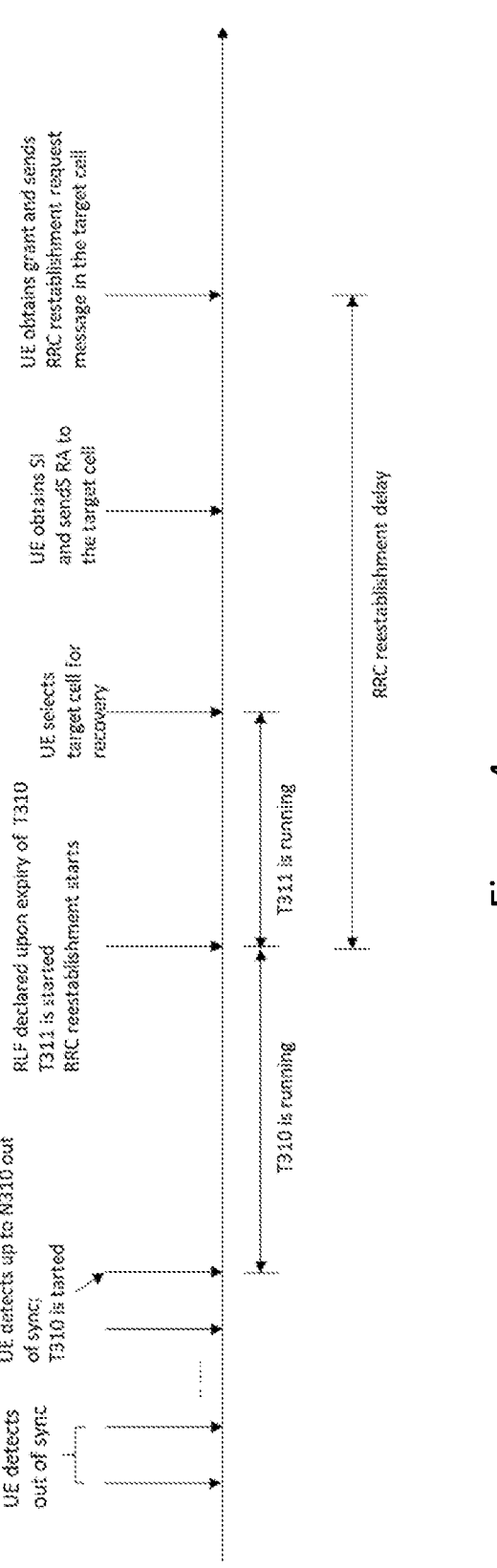
FIG. 4 shows a RLF procedure.

FIG. 3 corresponds to FIG. 4.2.1-1 from 3GPP TS 38.331 v16.2.0, section 4.2.1, which illustrates an overview of the UE RRC state machine and state transitions in NR. A UE has only one RRC state in NR at one time.

Suspension of an RRC connection is initiated by the network. When the RRC connection is suspended, the UE stores the UE Inactive Access Stratum (AS) context and any configuration received from the network, and transits to RRC_INACTIVE state. The UE Inactive AS context is stored/saved so that it can be retrieved and used when the UE resumes. The RRC message sent from the gNB to the UE to suspend the RRC connection is integrity protected and ciphered. When the UE is suspended by receiving a RRC Release message, it receives an inactive RNTI (I-RNTI)

which is used for context identification. Also included in the RRC Release message is the NextHopChainingCount (NCC). The NCC is assigned by the gNB and used to derive security keys used by the encryption algorithm to encrypt user plane (UP) data.

An RRCResumeRequest message from the UE is sent on SRB0 (signaling radio bearer 0) and is not integrity protected. It contains the I-RNTI and a Resume MAC-I (Message Authentication Code-Integrity) used as authentication token (to know it is sent by the UE that received the RRC Release message). The Resume MAC-I is a 16-bit message authentication token, calculated by the UE using the stored integrity algorithm with input source Physical Cell Identity (PCI), target Cell-ID, source C-RNTI. The resumption of a suspended RRC connection is initiated by upper layers when the UE needs to transit from RRC_INACTIVE state to RRC CONNECTED state or by RRC layer to perform a RNA (RAN-based Notification Area) update or by RAN paging from Next Generation Radio Access Network (NG-RAN). When the RRC connection is resumed, the network configures the UE according to the RRC connection resume procedure based on the stored UE Inactive AS context and any RRC configuration received from the network. The RRC connection resume procedure re-activates AS security and re-establishes SRB(s) (signaling radio bearers) and DRB(s) (data radio bearers).

In response to a request to resume the RRC connection, the network may resume the suspended RRC connection and send the UE to RRC_CONNECTED, or reject the request to resume and send the UE to RRC_INACTIVE (with a wait timer), or directly re-suspend the RRC connection and send UE to RRC_INACTIVE, or directly release the RRC connection and send UE to RRC_IDLE, or instruct the UE to initiate Non-Access-Stratum (NAS) level recovery (in this case the network sends an RRC setup message).

Transition from RRC-CONNECTED to RRC-INACTIVE is described in to 3GPP TS 38.331 v16.2.0, section 5.3.8.3. According to 3GPP TS 38.331 v16.2.0, section 5.3.8.3, the UE shall:

> 1> if the RRCRelease includes suspendConfig:

>> 2> apply the received suspendConfig;

>> 2> remove all the entries within VarConditionalReconfig, if any;

>> 2> for each measId, if the associated reportConfig has a reportType set to condTriggerConfig:

>>> 3> for the associated reportConfigId:

>>>> 4> remove the entry with the matching reportConfigId from the reportConfigList within the VarMeasConfig;

>>> 3> if the associated measObjectId is only associated to a reportConfig with reportType set to condTriggerConfig:

>>>> 4> remove the entry with the matching measObjectId from the measObjectList within the VarMeasConfig;

>>> 3> remove the entry with the matching measId from the measIdList within the VarMeasConfig;

>> 2> reset MAC and release the default MAC Cell Group configuration, if any;

>> 2> re-establish RLC entities for SRB1;

>> 2> if the RRCRelease message with suspendConfig was received in response to an RRCResumeRequest or an RRCResumeRequest1:

>>> 3> stop the timer T319 if running;

>>> 3> in the stored UE Inactive AS context:

>>>> 4> replace the $K_{gNB}$ and $K_{RRCint}$ keys with the current $K_{gBS}$ and $K_{RRCint}$ keys;

>>>> 4> replace the C-RNTI with the temporary C-RNTI in the cell the UE has received the RRCRelease message;

>>>> 4> replace the cellIdentity with the cellIdentity of the cell the UE has received the RRCRelease message;

>>>> 4> replace the physical cell identity with the physical cell identity of the cell the UE has received the RRCRelease message;

>> 2> else:

>>> 3> store in the UE Inactive AS Context the current $K_{gBS}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:

>>> parameters within ReconfigurationWithSync of the PCell;

>>> parameters within ReconfigurationWithSync of the NR PSCell, if configured;

>>> parameters within MobilityControlInfoSCG of the E-UTRA PSCell, if configured;

>>> servingCellConfigCommonSIB;

NOTE 2: NR sidelink communication related configurations and logged measurement configuration are not stored as UE Inactive AS Context, when UE enters RRC_INACTIVE.

>> 2> suspend all SRB(s) and DRB(s), except SRB0;

>> 2> indicate PDCP suspend to lower layers of all DRBs;

>> 2> if the t380 is included:

>>> 3> start timer T380, with the timer value set to t380;

>> 2> if the RRCRelease message is including the wait-Time:

>>> 3> start timer T302 with the value set to the wait-Time;

>>> 3> inform upper layers that access barring is applicable for all access categories except categories '0' and '2';

>> 2> if T390 is running:

>>> 3> stop timer T390 for all access categories;

>>> 3> perform the actions as specified in 5.3.14.4;

>> 2> indicate the suspension of the RRC connection to upper layers;

>> 2> enter RRC_INACTIVE and perform cell selection as specified in TS 38.304 [20];

According to 3GPP TS 38.331 v16.2.0, the information element (IE) suspendConfig is carried in a RRCRelease message, and indicates configuration for the RRC_INACTIVE state. The network does not configure suspendConfig when the network redirect the UE to an inter-RAT carrier frequency or if the UE is configured with a DAPS bearer. The IE suspendConfig is specified in 3GPP TS 38.331 v16.2.0 as:

```
SuspendConfig ::=           SEQUENCE {
  fullI-RNTI                I-RNTI-Value,
  shortI-RNTI               ShortI-RNTI-Value,
  ran-PagingCycle           PagingCycle,
  ran-NotificationAreaInfo  RAN-NotificationAreaInfo OPTIONAL, -- Need M
  t380                      PeriodicRNAU-TimerValue          OPTIONAL, -- Need R
  nextHopChainingCount      NextHopChainingCount,
  ...
}
```

Radio Link Failure (RLF) Procedure

The current RRM (Radio Resource Management)/RLM (Radio Link Monitoring) functions do not consider the possibility to transit to inactive state. In case a RLF procedure fails (that is, the UE is not in coverage of any cell), the UE transits to idle state. A RLF procedure for LTE and NR is illustrated in FIG. 4. As can be seen in FIG. 4, in addition to the RACH and RRC signaling delay when a UE goes to RLF/IDLE, there is the delay for cell search when the UE makes an RLF (stipulated by the standard). This delay can be addressed by RRCConnectionRelease (including redirectCarrierInfo) so that the UE knows the frequencies of the adjacent cells.

Long Delay Before Transmission of Data after RLF

Figure 5:
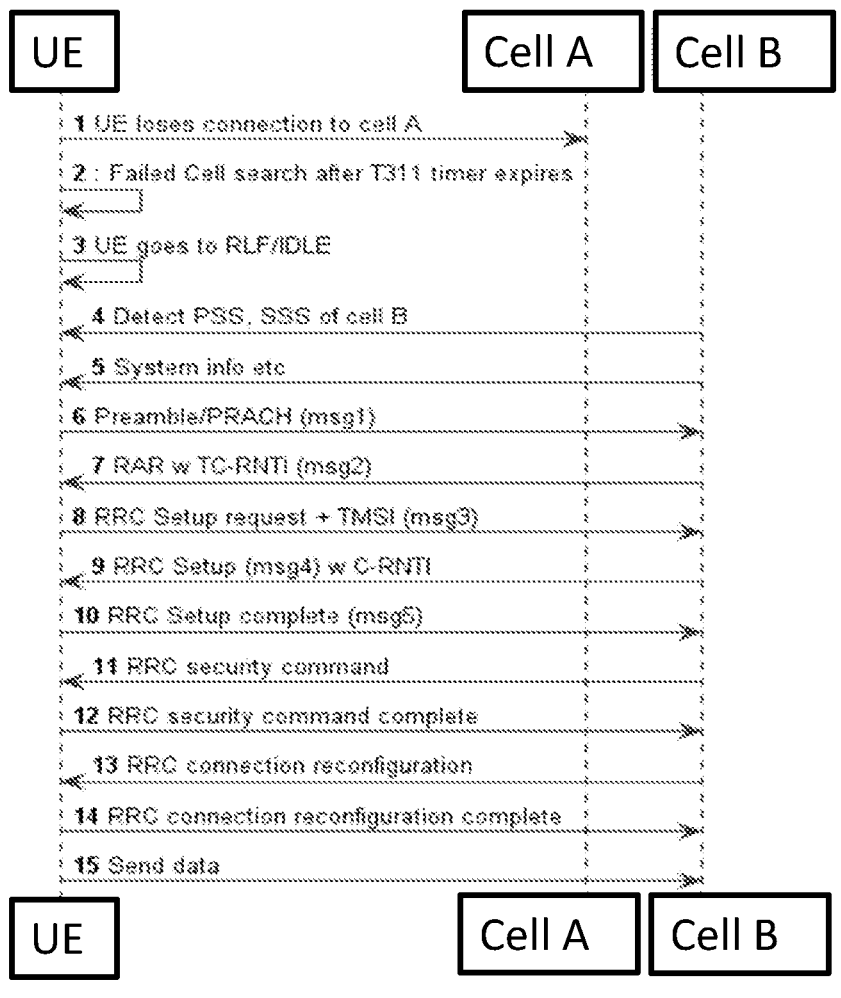
FIG. 5 shows a signaling diagram for an example scenario where a UE transmits data after a RLF.

According to current standards, when a UE loses its connection to its cell and has no suitable cell to hand over to, it declares RLF failure and goes to idle state. Once the UE comes into coverage of a new cell (or back to the cell it lost coverage from), it can establish a new connection again, by sending a RRCSetupRequest in msg 3. This is illustrated in FIG. 5. In this scenario, as illustrated in FIG. 5, the UE has to perform the whole set-up procedure, just to transmit a small data packet. In other words, FIG. 5 illustrates an example scenario with default signaling, where the UE loses connection and the timer T311 in FIG. 4 expires (for more information about the timer T311, see for example 3GPP TS 38.331 v16.2.0). The UE must then enter RLF/IDLE. To transmit even a small amount of data after that, the UE has to perform the complete RRC setup procedure.

The current trends for future radio networks are to go to higher and higher frequencies. Higher frequencies typically imply worse or more spotty coverage. A procedure which puts the UE to idle state every time it loses coverage is not optimal or efficient.

One way that could be attempted for addressing the long and slow setup procedure is to use Small Data Transmissions (SDT), in accordance with [1]. The SDT employs a faster and shorter setup procedure and fewer RRC message exchanges would be needed. However, the UE must be in inactive state when transmitting SDT, so SDT does not work when the UE is in idle state.

Irrespective of why the UE loses coverage when it is in connected or inactive state, it will be put in idle state. According to the current standard, there is no way to put a UE back in inactive state once the connection is lost and the UE has been put in idle state (except of course to first transition the UE to connected state and then transition the UE to inactive state). In principle, the network can page the UE when it discovers that the UE is no longer in connected or inactive state. But this may require extensive signaling since it may not always be clear to the network that the UE has transited to idle state.

Figure 6:
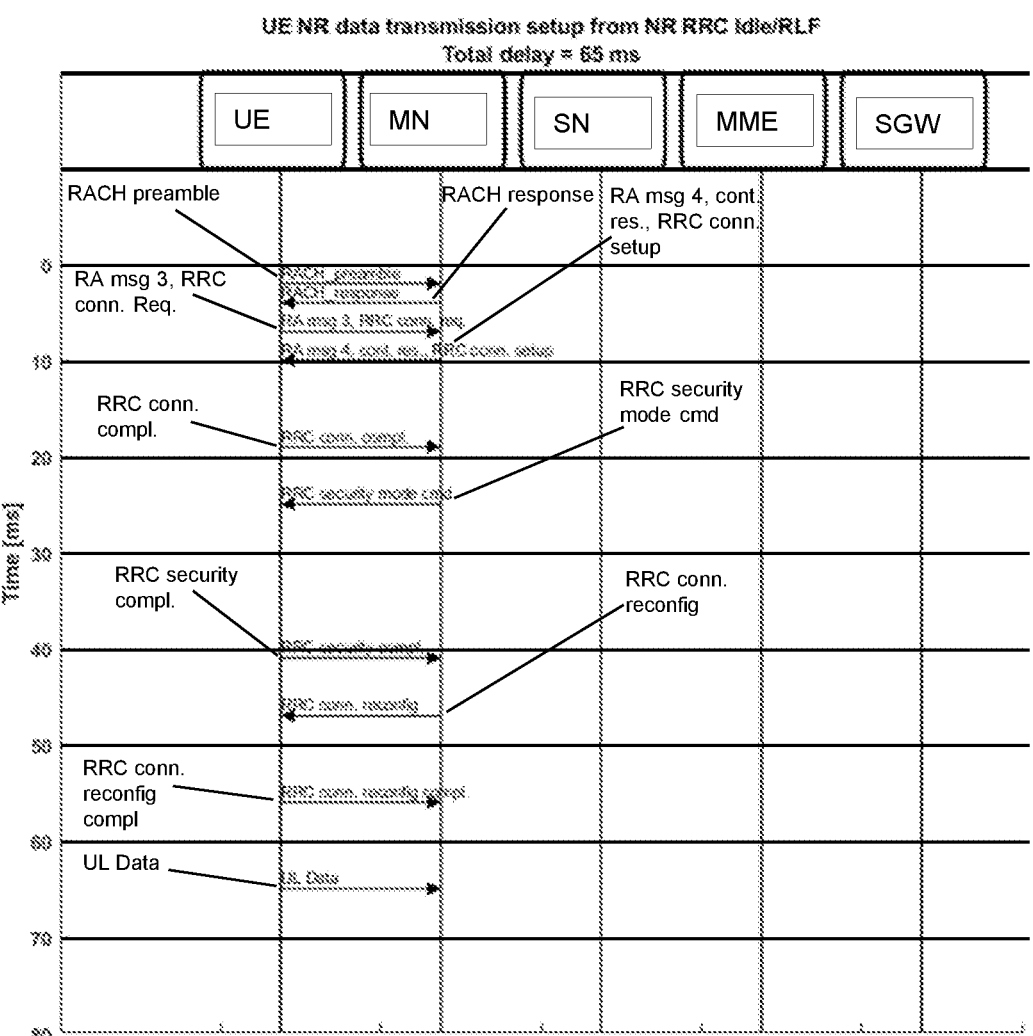
FIG. 6 shows a signaling diagram and delays associated with performing RRC setup from idle state.

The time needed for performing the RRC setup from idle state can be estimated using default delay values for UE processing times and signaling delays. The whole set-up procedure takes about 65 ms using default signaling delays, as illustrated in FIG. 6. Note that we here ignore the delays for accessing synch signals and system information. FIG. 6 shows a signaling diagram for a UE going from IDLE/RLF to connection in about 65 ms.

Long Delay Before Transmission of Data after Camping on 'any Cell'

Figure 7:
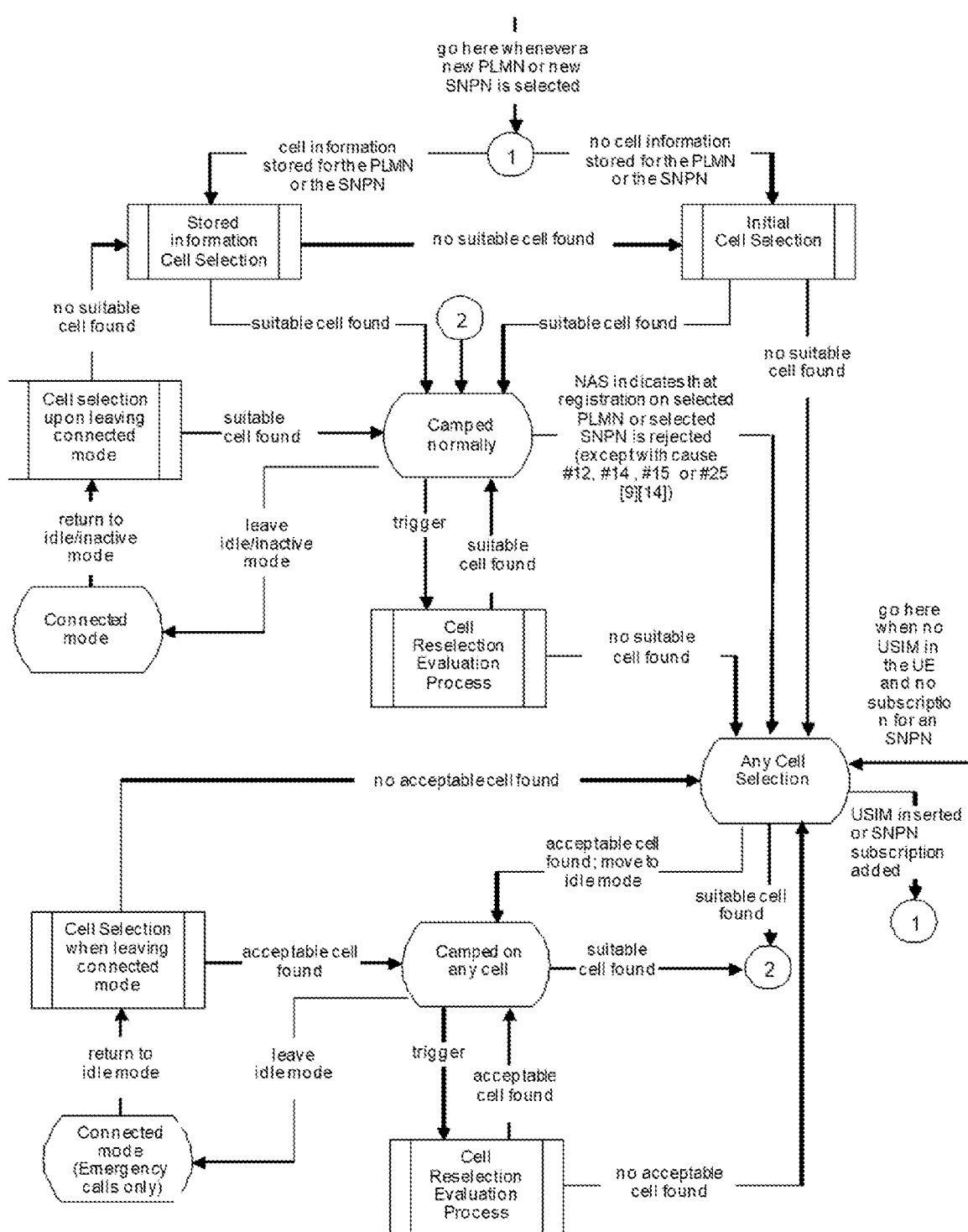
FIG. 7 shows an overview of RRC_IDLE and RRC_I-NACTIVE cell selection and reselection.

Another scenario where the UE may autonomously move to Idle state is from Inactive state. This is illustrated in FIG. 7, which corresponds to FIG. 5.2.2-1 from 3GPP TS 38.304 v 16.2.0, and which shows RRC_IDLE and RRC_INACTIVE Cell Selection and Reselection. If a UE fails to camp on a "suitable cell" (that is, from its own Public Land Mobile Network, PLMN), it will camp on "any cell" (that is, not its own PLMN). When doing so it will transit to idle state and can transit to connected state to do an emergency call on this cell. As shown in FIG. 7, when the UE returns to its own PLMN, it will camp on a suitable cell but will still be in idle state. In other words, the UE will not return to inactive state even though it returns into coverage and camps on a suitable cell. Hence, if the UE needs to send data (that is, not merely make an emergency call), then there will be a significant delay in analogy with the scenario described above with reference to FIGS. 5-6.

In some scenarios, the UE may initially have been put in inactive state to make its small data transmissions efficient (that is, small data transmissions in accordance with [1]). However, now that the UE has transitioned to idle state, it will have to do a normal Session Set up to transmit its small data packet.

Transition to or Remain in Inactive State

In view of the delays described in the two preceding sections, it would be beneficial with a mechanism that would enable the UE to remain in inactive state (or transition to inactive state) instead of going to idle state when the connection is temporarily lost.

Hence, the present disclosure provides embodiments of a method to allow a WCD (such as a UE) to remain in or move to inactive state instead of being sent to idle state, even if the connection or coverage is temporarily lost. Some embodiments of the method are applicable to both connected UEs who lose connection (RLF leading to idle state) and inactive UEs who temporarily camp on any cell (that is, a cell not belonging to the UE's own PLMN) and would therefore traditionally move to idle state. Some embodiments setup and enable an implicit RRC Suspension (which may also be referred to as an automatic RRC Suspension or a UE-autonomous RRC Suspension) in case of later radio link problems (for example, based on if certain conditions are fulfilled).

According to a first embodiment, in a first step, the gNB sends a new conditional RRC release message with suspendConfig including a new condition regarding when to use the suspendConfig. The new message can for example be the legacy RRC release message with suspendConfig plus a new condition regarding when to use the suspendConfig. When the conditional RRC release message with suspend- Config plus the new condition regarding when to use the suspendConfig is received by the UE, the UE saves its current state (and this is also done by the gNB at this time so both states are in synch). The UE's state may for example include the UE context, such as the UE Inactive AS context.

According to the first embodiment, in a second step, when the new condition in suspendConfig is fulfilled, the UE transits to inactive state, that is, executes the legacy actions it would perform when receiving a RRCRelease with suspendConfig, except storing the UE AS context (because the UE AS context has now already been stored by the UE). The conditional release message contains the needed parameters for encryption and context fetching (I-RNTI, NextHopChainingCount) to use when the UE does a future resume (for example using a RRCResumeRequest, which has been described above).

According to the first embodiment, in a third step, when the UE at a later time comes into coverage, it can use the inactive state procedures to transmit small data instead of being forced to reestablish the connection before transmitting small data. The UE may thereby obtain the gains of utilizing small data transmissions (SDT) in inactive state, in accordance with [1]. Also in case the UE does not support NR Release 17 SDT, the UE would benefit from the signaling reduction associated with resuming a stored RRC connection from inactive state rather than setting up a new connection from idle state.

At least some embodiments presented herein may be referred to as conditional suspend for fast small data transmission.

According to legacy behavior, the inactive UEs that camp on any cell (that is, not belonging to the UE's own PLMN) would be moved to idle state. But, the condition in the proposed new conditional RRC release message can be applied also for this scenario. Hence, these UEs will remain in inactive state when they return into coverage and camp on a suitable cell (that is, a cell belonging to the UE's own PLMN).

At least some embodiments enable UEs which lose coverage to remain in inactive state to be able to later perform small data transmissions or resume a stored RRC connection to reduce signaling overhead. This means that a UE can transmit a small amount of data with lower delay when a new cell is found.

FIG. 8 shows signaling delay for a UE going from inactive state to connected state. Note that the signaling delay for a UE going from inactive state to connected state is less than ms, compared to 65 ms delay if the UE would have been in idle state after RLF (as described above with reference to FIGS. 5-6).

DETAILED EXAMPLE EMBODIMENTS

A detailed signaling diagram associated with an example embodiment is depicted in FIG. 9. This example embodiment employs Conditional RRC suspend with small data transmission using four-step random access.

In step 1, the gNB sends a conditional RRC release message with suspendConfig. This is done at an early stage when the UE is in connected state and the RRC release message (or the suspendConfig) is stored in the UE in case of later radio link problems (in contrast to the legacy RRC Release message when terminating the connection as in NR Release 15 legacy behavior). The proposed approach allows the UE to enter inactive state at a later time when coverage is lost. The reception of the conditional RRC release message also triggers the UE to save the present version of its UE state (or UE context) which is also stored at the gNB. In this way, these states are synchronized between the UE and the network (that is, the UE and the network have stored the same UE context, so there is no mismatch). It is also possible that the gNB sends a new conditional RRC release message with suspendConfig at a later time, so that the UE and gNB update the parameters saved in the UE context.

In step 2, the coverage is lost to cell A.

In step 3, the UE cell search fails and the T311 timer expires. As an alternative, a new timer "Tcond" can be defined. The timer setting of Tcond should be less than or equal to T311 (that is, the timer Tcond could have a shorter duration than the timer T311 or the same duration as the timer 311). When the timer (whichever is used for the conditional suspend, for example T311 or Tcond) expires, the condition to apply the conditional release (such as suspendConfig) is fulfilled.

In step 4, the UE enters inactive state. The UE executes the suspendConfig message. The suspendConfig contains the needed parameters for encryption and context fetching (I-RNTI, NextHopChainingCount) to use when the UE does a future resume (described above).

In steps 5-6, the UE at a later time comes into coverage and can synch with PSS/SSS of a cell (referred to as cell B) and can read the system information needed for a random access to cell B.

In steps 7-9, the UE can now use the fact that it is in inactive state to transmit small data instead of being forced to reestablish the connection before transmitting small data. In step 7, the UE sends a normal preamble/PRACH to cell B. In step 8 the cell B responds with a random access response (RAR) and a TC-RNTI. In step 9, the small data is transmitted in msg3.

In another example embodiment, the UE uses the two-step random access procedure to transmit small data, instead of the four-step random access procedure. In this case, the small data is transmitted in msgA instead of in msg3.

In another example embodiment, the UE uses one or more configured grants (instead of msg3 or msgA) to transmit the small data and possibly RRC information. Hence, the steps 7-9 in FIG. 9 could be replaced by the small data transmission on configured grant resources. Configured grant resources could for example be used for the small data transmission when the UE has entered a coverage hole and regains coverage with the same cell where it lost coverage (in other words, in situations where Cell A and Cell B in FIG. 9 are the same cell). In situations where Cell B is different than Cell A, configured grant resources configured earlier by Cell A may not be available in Cell B, so such configured grant resources may not be available for small data transmission.

In another example embodiment, the UE uses Release 15 RRC resumption for the later connection setup. In other words, the resume request in step 9 in FIG. 9 may be the legacy Release 15 RRC resumption request.

Examples of Conditional Suspend Triggers and Conditions

For the proposed RRC message indicating conditional suspend, the conditions for when the transition to inactive state is triggered may for example be of two basic kinds. For UEs in connected state, the transition to inactive state may be triggered by lost coverage and failure to find a new cell within a certain time (for example, when Tcond or T311 expires, and described above). For UEs in inactive state, a trigger (that is, a trigger for remaining in inactive state instead of transitioning to idle state) may be that the UE cannot find a suitable cell and instead camps on any cell (that is, a cell belonging to a different PLMN), as described above with reference to FIG. 7.

In addition to such triggers, there may be different situations or cases where the proposed conditional suspend (and/or the associated small data transmission in inactive state and/or the associated resumption) is applied or is not applied:

Depending on the UE activity when it is in connected state, for example if the UE mostly transmits small data when in connected state or after some period of UE inactivity in connected state. Depending on a UEs historical behavior in connected state, the UE can for example either use the proposed conditional suspend or choose to perform legacy behavior.

The UE behavior may depend on which cell(s) the UE may resume in. Some UEs may for example only resume in the same cell from where coverage was lost, or in the neighboring cells, or in a specific area of the radio access network (such as in a certain set of cells).

For the situation where a UE has transitioned to inactive state by a conditional suspend, there may be a maximum time specified for how long the UE may stay in inactive state before transitioning to idle state. This may also be governed by a timer. In other words, the UE may transition from inactive state to idle state if the UE has been a certain time in inactive state after a conditional suspend.

A maximum time may be configured for how long a UE can be out of coverage. If the UE does not come back into coverage during the configured maximum time, it will go to idle state. Such a maximum time may for example be employed also when the UE has previously remained in inactive state when 'camped on any cell' as described above with reference to FIG. 7.

Depending on specific UE capabilities or UE types.

In an example embodiment, the condition(s) under which the UE should attempt implicit RRC resumption as outlined above is not sent by dedicated signaling as part of the suspendConfig, but is instead sent via signaling in system information or may be hard coded in the 3GPP specification.

Similarly, the condition(s) under which the UE should transition to (or remain in) inactive state need not necessarily be sent by dedicated signaling as part of the suspendConfig, but could instead be sent via signaling in system information. Another option is that the condition(s) are hard coded in the 3GPP specification, so that the UE knows which condition(s) to employ, even if the suspendConfig does not instruct the UE explicitly which condition(s) to employ.

In another example embodiment, conditions are also configured for the extent at which the UE should attempt an implicit RRC resumption (as outlined above). For example, it may be configured (either explicitly or implicitly) that the UE will attempt RRC resumption of small data transmissions with the UE context and configuration in suspendConfig a certain number of times, and after that move to idle state and follow legacy behavior. Another option is to use a timer in a similar manner (in other words, the UE may attempt several times until a timer expires, rather than attempting a predefined number of times).

Further Method Embodiments

Further method embodiments will now be described with reference to FIGS. 10-13. These embodiments reflect ideas presented above with reference to FIGS. 1-9, for example in the three preceding subsections of the detailed description. Optional features are represented in FIGS. 10-13 with dashed lines/boxes.

Figure 10:
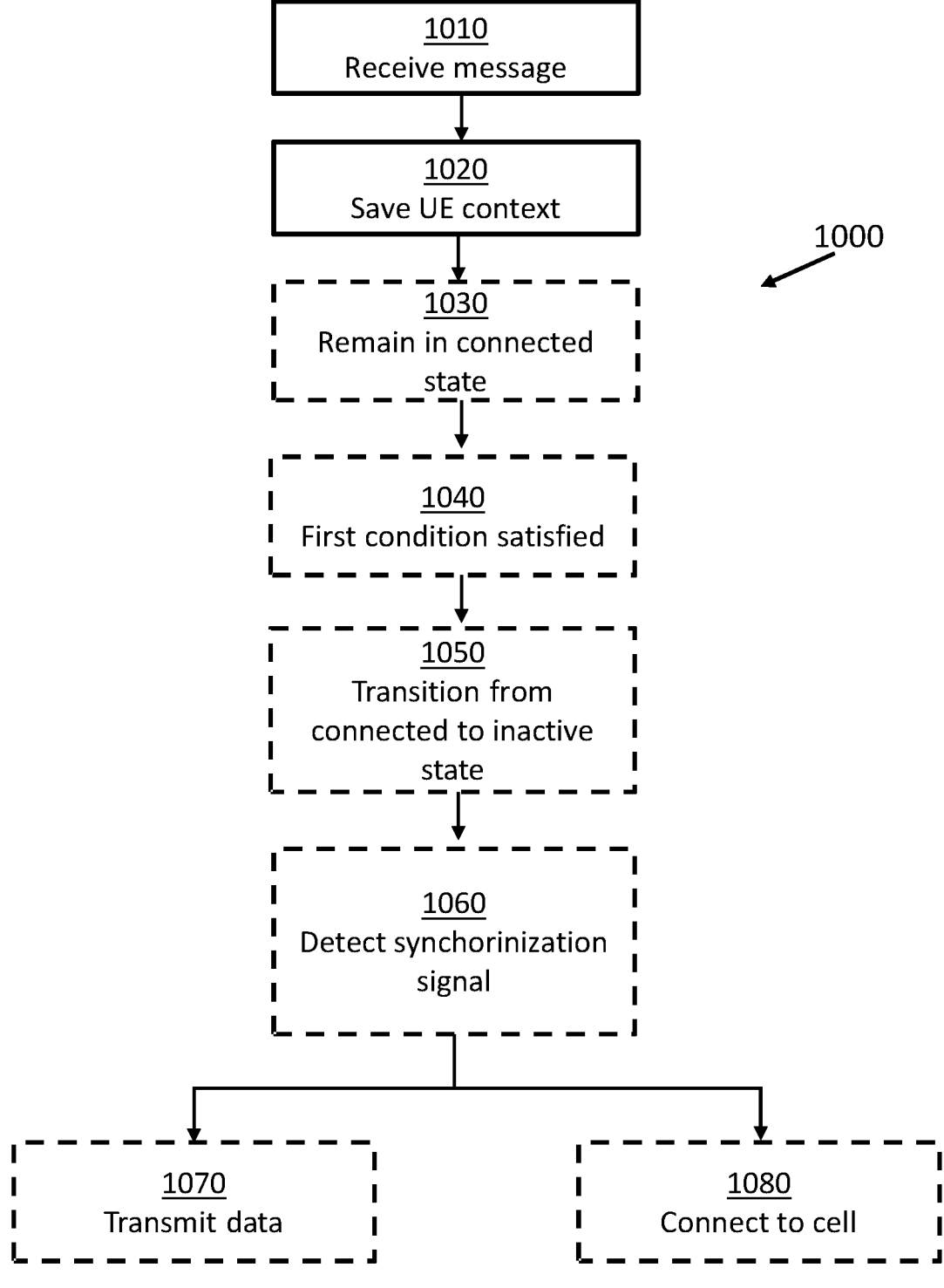
FIGS. 10-11 are flow charts of methods at a WCD, according to some embodiments.

FIG. 10 shows a flow chart of a method 1000 at a wireless communication device (WCD), according to an embodiment of a first aspect of the present disclosure. The method 1000 may for example be performed by the WCD, or by one or more parts/portions/components of the WCD. The WCD may be any type of device that is able to communicate wirelessly, for example with a wireless communication network (such as a cellular network). Some examples of a WCD include, but are not limited to, a User Equipment (UE) in a 3GPP network, a Machine Type Communication (MTC) device, and an Internet of Things (IoT) device. The WCD may for example be (or may for example be integrated into) a mobile phone, smart phone, sensor device, meter, vehicle, household appliance, medical appliance, media player, camera, or any type of consumer electronic device, for instance, but not limited to, a television, radio, lighting arrangement, tablet computer, laptop, or personal computer (PC). The WCD may for example be a portable, hand-held, computer-comprised, or vehicle-mounted mobile device, enabled to communicate voice and/or data via a wireless connection.

The method 1000 comprises receiving 1010 a message from a network node in a communication network. The message indicates (for example explicitly or implicitly) that the WCD is to save a UE context of the WCD. The UE context may for example be a UE Inactive Access Stratum (AS) context. The UE context may for example comprise information to define SRBs and DRBs configured for the WCD, such as for example Packet Data Convergence Protocol (PDCP), Radio Link Control (RLC) and Medium Access Control (MAC) parameters. The network node referred to in the method 1000 may be any node in a communication network that is able to communicate wirelessly with the WCD, such as a node in a Radio Access Network (RAN) of a cellular communications network that operates to wirelessly transmit and/or receive signals. Some examples of a network node include, but are not limited to, a base station (for example a gNB in a 3GPP Fifth Generation (5G) NR network or an enhanced or evolved Node B (eNB) in a 3GPP LTE network), a high-power or macro base station, a low-power base station (for example a micro base station, a pico base station, a home eNB, or the like), a relay node, a network node that implements part of the functionality of a base station (for example a network node that implements a gNB Central Unit (gNB-CU) or a network node that implements a gNB Distributed Unit (gNB-DU)) or a network node that implements part of the functionality of some other type of node in a RAN. The communication network referred to in the method 1000 may for example be a cellular communications network (such as the network 1400 described below with reference to FIG. 14), but could also be some other type of communication network.

The method 1000 comprises saving 1020 (or storing) the UE context of the WCD in response to receiving 1020 the message. The UE context may for example be saved in a local memory comprised in the WCD, or in some other memory (for example an external memory) to which the WCD has access. The UE context that is saved at step 1020 may for example the UE context of the WCD which applies when the UE receives 1020 the message, or a UE context which applies a certain time after receipt of the message. The UE context may for example be saved immediately upon receipt of the message, or there may be some delay before it is saved.

The message received at step 1010 also indicates (for example explicitly or implicitly) that the WCD is to transition from a connected state to an inactive state when a first condition is satisfied. As further described below with reference to FIG. 11, the message received at step 1010 could alternatively or additionally indicate that the WCD is to remain in an inactive state when a second condition is satisfied. The connected state may for example be the state or mode denoted by RRC_CONNECTED in the 3GPP NR specification. The inactive state may for example be the state or mode denoted by RRC_INACTIVE in the 3GPP NR specification. The message received at step 1010 may for example explicitly indicate the first condition to the WCD, or the first condition itself may be communicated in some other way to the WCD (or may be predefined in the WCD) and the message received at step 1010 may indicate (or confirm) to the WCD that this first condition is to be employed.

The first condition may for example include that the WCD experiences (or detects) a loss of connection or loss of coverage. The WCD may for example move out of coverage of a cell to which it has been connected. The first condition may for example include several parts or sub-conditions. For example, the first condition may include that the WCD experiences a loss of connection or loss of coverage and that the WCD is unable to find a new cell to camp on. As another example, the first condition may include that the WCD experiences a loss of connection or loss of coverage, and that the WCD is unable to find a new cell to camp on within a certain time. This certain time may for example be predefined.

The first condition may for example include that the WCD experiences (or detects) a radio link failure (RLF). The first condition may for example include several parts or sub-conditions. For example, the first condition may include that the WCD experiences a RLF and that a T311 timer expires (such as the T311 timer in 3GPP TS 38.331 v16.2.0 and indicated in FIG. 4). As another example, the first condition may include that the WCD experiences a RLF and that a timer (such as the timer Tcond referred to above in connection with FIG. 9) expires, wherein this timer has a duration which is shorter than or equal to a duration of a T311 timer (such as the T311 timer in 3GPP TS 38.331 v16.2.0 and indicated in FIG. 4).

The first condition may for example include that the WCD:
  experiences a loss of connection or loss of coverage from a cell associated with a first network, and
  is unable to find a cell (such as a 'suitable cell' in FIG. 7) to camp on (such as 'Camped normally' in FIG. 7) which is associated with the first network, and
  instead finds a cell (such as 'acceptable cell' in FIG. 7) to camp on (such as a 'Camped on any cell' in FIG. 7) which is associated with a second network.

The first network may for example be a network to which the WCD (or its user) belongs or is associated (for example via a subscription or contract), while the WCD may have a more limited or restricted access to the second network (for example emergency calls only). The first network may for example be a Public Land Mobile Network (PLMN) and the second network may be a Stand-alone Non-Public Network (SNPN) or a different PLMN than the first network. The first network may for example be a SNPN and the second network may be a PLMN or a different SNPN than the first network.

As described above with reference to FIGS. 3-9, the ability of the WCD to transition from the connected state to the inactive state (instead of transitioning to an idle state) when the first condition is satisfied (for example loss of coverage or RLF), may allow the WCD to transmit data more quickly in the uplink when the WCD regains coverage. The idle state referred to herein may for example be the state or mode denoted by RRC_IDLE in the 3GPP NR specification. As described above with reference to FIGS. 3-9, the UE context saved at step 1020 may for example be employed to allow the WCD to more quickly connect to the network and/or more quickly transmit data in the uplink.

The message received as step 1010 may for example be a radio resource control (RRC) message, but could for example be some other type of message received by the WCD. The message received as step 1010 may for example comprise an information element (IE) suspendConfig (for example the legacy IE suspendConfig described above). The message may for example indicate that suspendConfig is to be used by the WCD when the first condition is satisfied. The message received at step 1010 may for example be similar to the legacy RRC Release message, but with a new/additional flag indicating that the WCD is to wait until the first condition is satisfied before using suspendConfig.

The message received as step 1010 may for example indicate one or more parameters for encryption and/or context fetching, to be used by the WCD for a future resumption of connection. The message may for example indicate an inactive radio network temporary identifier (I-RNTI). The message may for example indicate a Next Hop Chaining Counter (NCC).

The message received as step 1010 may for example be received while the WCD is in a connected state. The WCD may then remain 1030 in the connected state after receipt of the message until the first condition is satisfied 1040. Hence, in contrast to the legacy RRC Release message, the message received at step 1010 typically does not cause the WCD to immediately move/transition to inactive state. Instead, after receiving the message 1010, the WCD waits until the first condition is satisfied 1040 before transitioning 1050 from the connected state to the inactive state.

The first condition may for example involve use of a timer, such as a timer controlling how long to search for a new cell after loss of coverage or RLF before transitioning to inactive state and/or a timer controlling how long to remain in inactive state (after transitioning from connected state to inactive state) before transitioning to idle state. The duration of the timer may for example be indicated in the message received at step 1010, or may be indicated in another massage transmitted to the WCD, or may be predefined at the WCD.

The method 1000 may for example comprise detecting 1060 a synchronization signal from a cell in the communication network. The detection 1060 of the synchronization signal occurs after receiving 1010 the message and while the WCD is in inactive state (that is, after the transition 1050 to the inactive state). The synchronization signal may for example be a primary synchronization signal (PSS), a secondary synchronization signal (SSS) or a synchronization signal block (SSB).

The method 1000 may for example comprise using the UE context saved at step 1020 to transmit 1070 data to the communication network after detecting 1060 the synchronization signal. The data may for example be transmitted 1070 to the communication network via the same cell as was used for the transmission of the synchronization signal detected at step 1060.

The data may for example be transmitted 1070 while the WCD is in the inactive state, for example using small data transmissions in accordance with [1].

The data may for example be transmitted 1070 in a message 3 of a four-step random access procedure. As described above with reference to FIG. 1, message 3 is transmitted on PUSCH after receipt of RAR.

The data may for example be transmitted 1070 in a message A of a two-step random access procedure. More information about a two-step random access is provided above with reference to FIG. 2.

The message received at step 1010 may for example be received via a first cell served by the network node referred at step 1010. The data transmitted at step 1070 may for example be transmitted in (or using) uplink resources which were configured via the first cell while the WCD was in a connected state. In other words, while the WCD was in connected state and connected to the first cell, certain uplink resources were configured via a configured grant (for example configured grant type 1). Those configured uplink resources may then be employed by the WCD when in inactive state to transmit 1070 the data in the uplink. The synchronization signal detected at step 1060 may for example be received via the first cell. The data transmitted at step 1070 may for example be transmitted via the first cell. The WCD may for example temporarily lose coverage from the first cell but then detect the first cell again via the synchronization signal at step 1060, and the WCD may then transmit data to the first cell at step 1070. However, in other examples, the synchronization signal detected at step 1060 may be received via a second cell (distinct from the first cell), and the data transmitted at step 1070 may for example be transmitted via the second cell. Hence, the first cell could be employed for configuring configured grant resources associated with the second cell, so that the WCD can transmit on the second cell using those configured grant resources later when the WCD is in inactive state.

Alternatively, or additionally to the step 1070, the method 1000 may for example comprise using the saved UE context of the WCD to connect 1080 to the cell (that is, the cell via which the synchronization signal was detected at step 1060). At step 1080, the WCD may for example transition from inactive state to connected state. As described above with reference to FIGS. 3-6 and 8-9, since the UE context is stored at the WCD and at the network side, the UE context may be employed to allow the UE to reach connected state more quickly than if the WCD would have to go through the entire ordinary procedure for setting up a connection.

Figure 11:
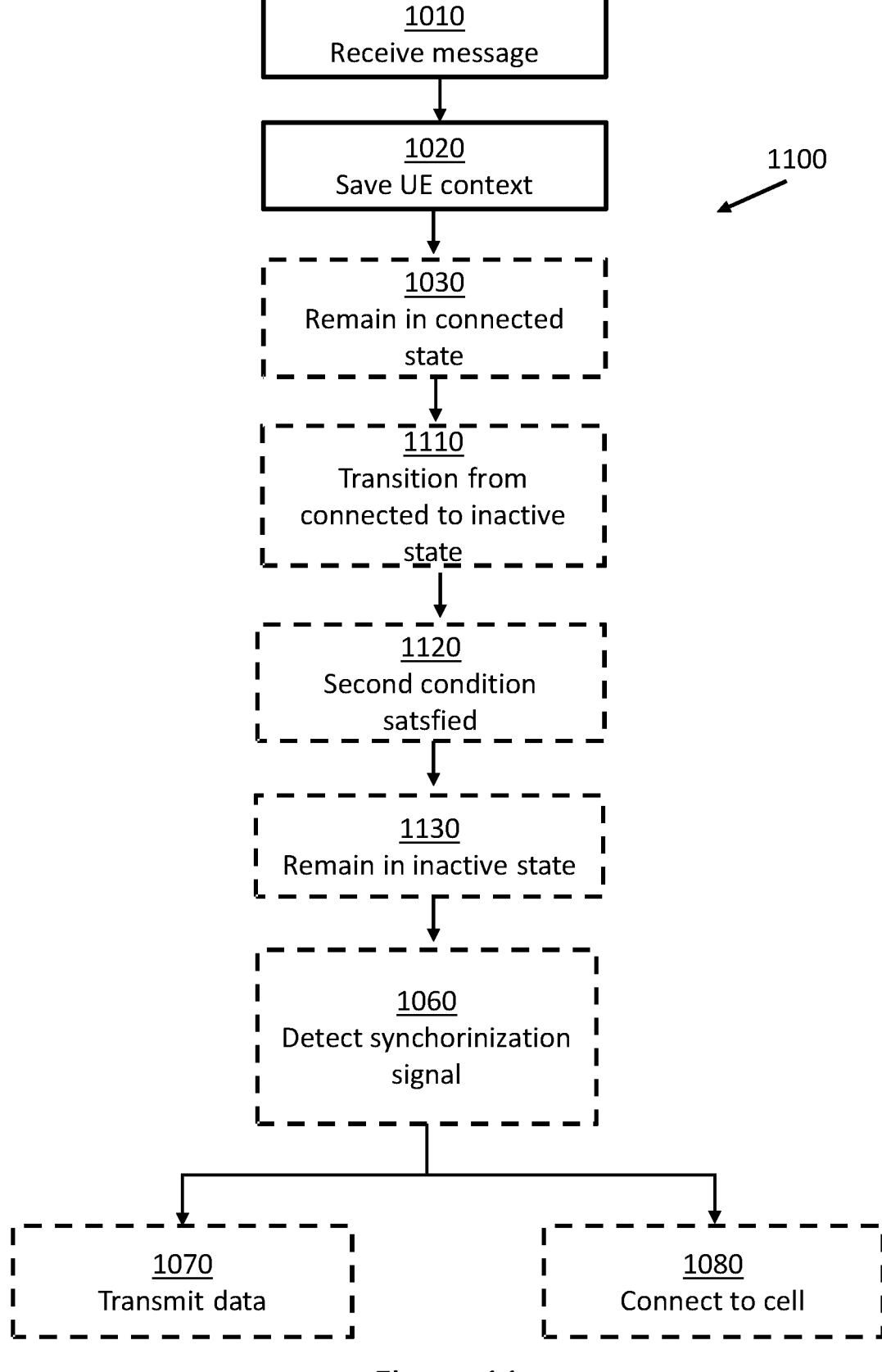

FIG. 11 shows a flow chart of a method 1100 at a WCD, according to an embodiment of the first aspect of the present disclosure. The method 1100 has many things in common with the method 1000 and may be performed by the same type of WCD as the method 1000. The method 1100 also comprises the steps 1010 and 1020 from the method 1000, but the message received at step 1010 may be different than in the method 1000, as further described below. It will be appreciated that features and/or advantages described above in connection with the method 1000 may apply also to corresponding parts of the method 1100.

In the method 1100, the message received at step 1010 indicates that the WCD is to remain in inactive state when a second condition is satisfied. When the message is received 1010, the WCD may be in connected state, but the WCD may later transition 1110 from connected state to inactive state (for example as a result of a legacy RRC Release message with IE suspendConfig or as a result of the message received at step 1010). As described above with reference to FIG. 7, while a legacy WCD is in inactive state it may experience a loss of connection or loss of coverage, which may cause the legacy WCD to transition to idle state. The WCD performing the method 1100 may employ the second condition (indicated in the message received at the step 1010), so that the WCD remains in inactive state instead of transitioning to the idle state. In other words, when the second condition is satisfied 1120, the WCD may remain 1130 in the inactive state instead of transitioning to the idle state.

The second condition may for example include that the WCD experiences (or detects) a loss of connection or loss of coverage. The WCD may for example move out of coverage of a cell to which it has been connected. The second condition may for example include several parts or sub-conditions. For example, the second condition may include that the WCD experiences a loss of connection or loss of coverage and that the WCD is unable to find a new cell to camp on. As another example, the second condition may include that the WCD experiences a loss of connection or loss of coverage, and that the WCD is unable to find a new cell to camp on within a certain time. This certain time may for example be predefined.

The second condition may for example include that the WCD experiences (or detects) a radio link failure (RLF). The second condition may for example include several parts or sub-conditions. For example, the second condition may include that the WCD experiences a RLF and that a T311 timer expires (such as the T311 timer in 3GPP TS 38.331 v16.2.0 and indicated in FIG. 4). As another example, the second condition may include that the WCD experiences a RLF and that a timer (such as the timer Tcond referred to above in connection with FIG. 9) expires, wherein this timer has a duration which is shorter than or equal to a duration of a T311 timer (such as the T311 timer in 3GPP TS 38.331 v16.2.0 and indicated in FIG. 4).

The second condition may for example include that the WCD:

experiences a loss of connection or loss of coverage from a cell associated with a first network, and is unable to find a cell (such as a 'suitable cell' in FIG. 7) to camp on (such as 'Camped normally' in FIG. 7) which is associated with the first network, and instead finds a cell (such as 'acceptable cell' in FIG. 7) to camp on (such as a 'Camped on any cell' in FIG. 7) which is associated with a second network.

The first network may for example be a network to which the WCD (or its user) belongs or is associated (for example via a subscription or contract), while the WCD may have a more limited or restricted access to the second network (for example emergency calls only). The first network may for example be a Public Land Mobile Network (PLMN) and the second network may be a Stand-alone Non-Public Network (SNPN) or a different PLMN than the first network. The first network may for example be a SNPN and the second network may be a PLMN or a different SNPN than the first network. As indicated in FIG. 7, when a legacy WCD is 'Camped on any cell' (that is, a cell from another PLMN or SNPN), it can only make emergency calls, and needs to restart connection from idle state to connected state (which involves substantial delay) before it can transmit data in the uplink. The method 1100 allows the WCD to remain in inactive state.

The message received at step 1010 may for example explicitly indicate the second condition to the WCD, or the second condition itself may be communicated in some other way to the WCD (or may be predefined in the WCD) and the message received at step 1010 may indicate (or confirm) to the UE that this second condition is to be employed.

The second condition may for example involve use of a timer, such as a timer controlling how long to search for a new cell (for example a 'suitable cell' in FIG. 7) after loss of coverage before transitioning to idle state. The duration of the timer may for example be indicated in the message received at step 1010, or may be indicated in another massage transmitted to the WCD, or may be predefined at the WCD.

Similarly to the method 1000, the method 1100 may for example comprise the step 1030 of remaining in connected state (after receiving the message at step 1010), and/or the step 1060 of detecting a synchronization signal, and/or the step 1070 of transmitting data, and/or the step 1080 of connecting to a cell.

Figure 12:
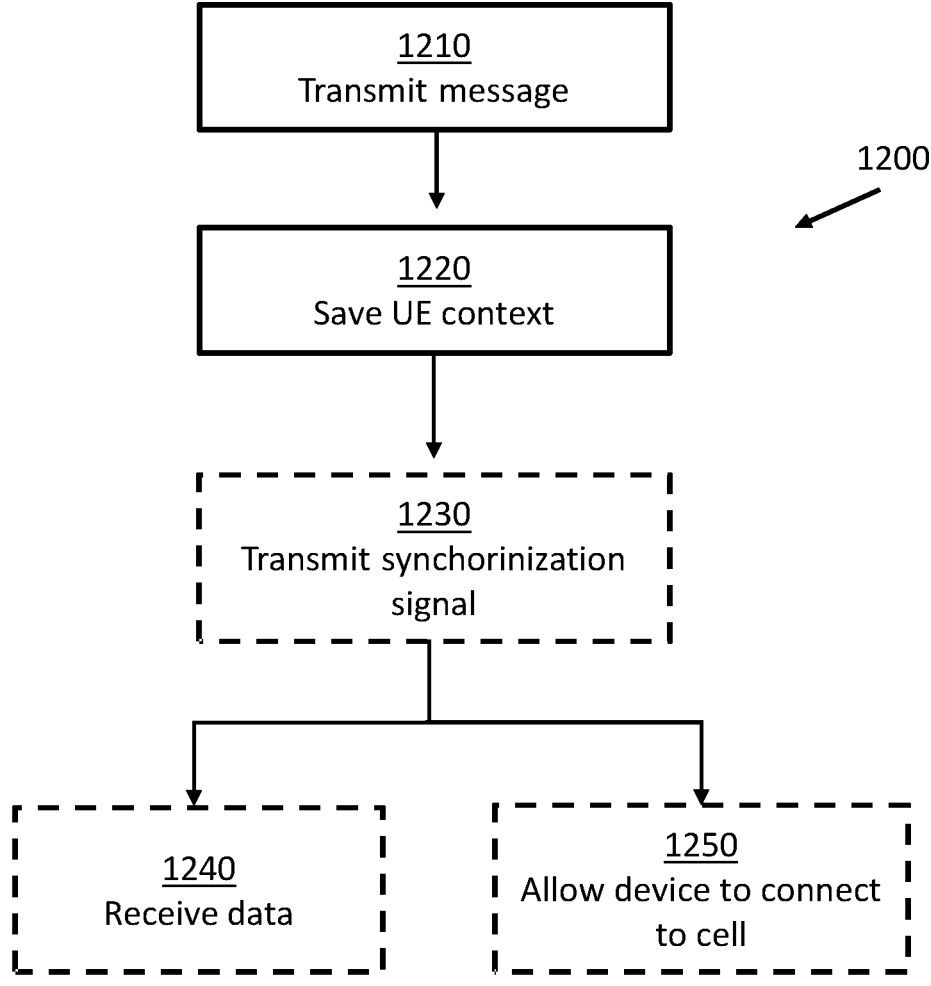
FIG. 12 is a flow chart of a method at a network node, according to some embodiments.

FIG. 12 shows a flow chart of a method 1200 at a network node in a communication network, according to an embodiment of the third aspect of the present disclosure. The method 1200 may for example be performed by the network node, or by one or more parts/portions/components of the network node. The network node referred to in the method 1200 may be any node in a communication network that is able to communicate wirelessly with the WCD, such as a node in a Radio Access Network (RAN) of a cellular communications network that operates to wirelessly transmit and/or receive signals. Some examples of a network node include, but are not limited to, a base station (for example a gNB in a 3GPP Fifth Generation (5G) NR network or an enhanced or evolved Node B (eNB) in a 3GPP LTE network), a high-power or macro base station, a low-power base station (for example a micro base station, a pico base station, a home eNB, or the like), a relay node, a network node that implements part of the functionality of a base station (for example a network node that implements a gNB Central Unit (gNB-CU) or a network node that implements a gNB Distributed Unit (gNB-DU)) or a network node that implements part of the functionality of some other type of node in a RAN. The communication network referred to in the method 1200 may for example be a cellular communications network (such as the network 1400 described below with reference to FIG. 14), but could also be some other type of communication network.

Figure 13:
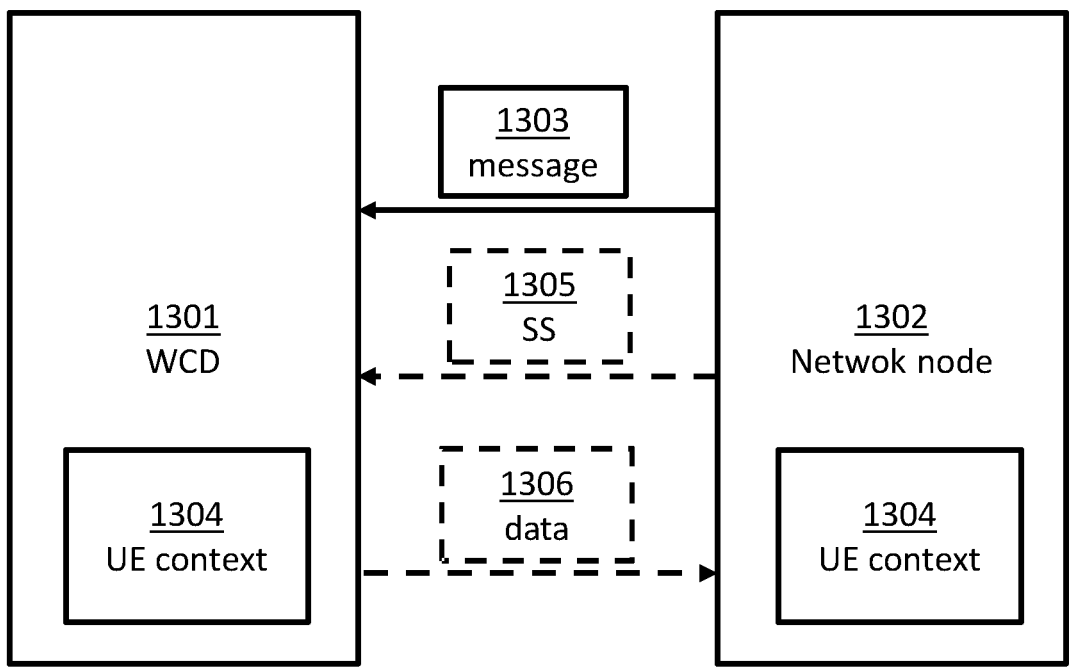
FIG. 13 illustrates transmissions between a WCD and a network node, according to some embodiments.

The method 1200 has steps corresponding to steps in the methods 1000 and 1100 described above with reference to FIGS. 10-11. It will be appreciated that features and/or advantages described above in connection with the methods 1000 and 1100 may apply also to corresponding parts of the method 1200. FIG. 13 illustrates transmissions between a WCD 1301 performing the method 1000 or 1100 and a network node 1302 performing the method 1200. The method 1200 will now be described with reference to FIGS. 12 and 13.

The method 1200 comprises transmitting 1210 a message 1303 to the WCD 1302. The message 1303 indicates that the WCD 1302 is to save a UE context 1304 of the WCD. The message 1304 may for example be transmitted 1210 to the WCD 1301 while the WCD 1301 is in a connected state. The method 1200 also comprises saving 1220 the UE context 1304 of the WCD. The UE context may for example be saved in an internal memory of the network node or in some other memory to which the network node has access. The message 1303 also indicates that the WCD 1302 is to transition from a connected state to an inactive state when a first condition is satisfied, and/or remain in an inactive state when a second condition is satisfied. The message 1303 transmitted at step 1210 in the method 1200 may for example be the same massage as received at step 1010 in the method 1000 or in the method 1100. The UE context 1304 saved at step 1220 in the method 1200 may for example be the same UE context as saved at step 1020 in the method 1000 or 1100.

The method 1200 may for example comprise transmitting 1230 a synchronization signal (SS) 1305 via a cell in the communication network. The synchronization signal 1305 may for example be the synchronization signal detected at step 1060 in the method 1000 or 1100. The synchronization signal 1305 is transmitted 1230 after transmitting 1210 the message 1303 and while the WCD 1301 is in inactive state.

The method 1200 may for example comprise using the saved UE context 1304 to receive 1240 data 1306 from the WCD 1301 after transmitting 1230 the synchronization signal 1305. The data 1306 may for example be the data transmitted at step 1070 in the method 1000 or 1100. The data 1306 may for example be received 1240 while the WCD 1301 is in inactive state. The data 1306 may for example be received 1240 in a message 3 of a four-step random access procedure, or in a message A of a two-step random access procedure. The message 1303 may for example be transmitted 1210 via a first cell served by the network node 1302, and the data 1306 may for example be received 1240 in uplink resources which were configured via the first cell while the WCD 1301 was in connected state. The synchronization signal 1305 may for example be transmitted 1240 via the first cell, and/or the data 1306 may be received 1240 via the first cell.

The method 1200 may for example comprise transmitting 1230 the synchronization signal 1305 via a cell in the communication network, and after transmitting 1230 the synchronization signal 1305, using the saved UE context 1304 to allow 1250 the WCD 1301 to connect to the cell. Allowing 1250 the WCD 1301 to connect to the cell may for example comprise allowing the WCD 1301 to transition from inactive state to connected state.

Embodiments of WCD, network nodes, computer programs etc.

Figure 14:
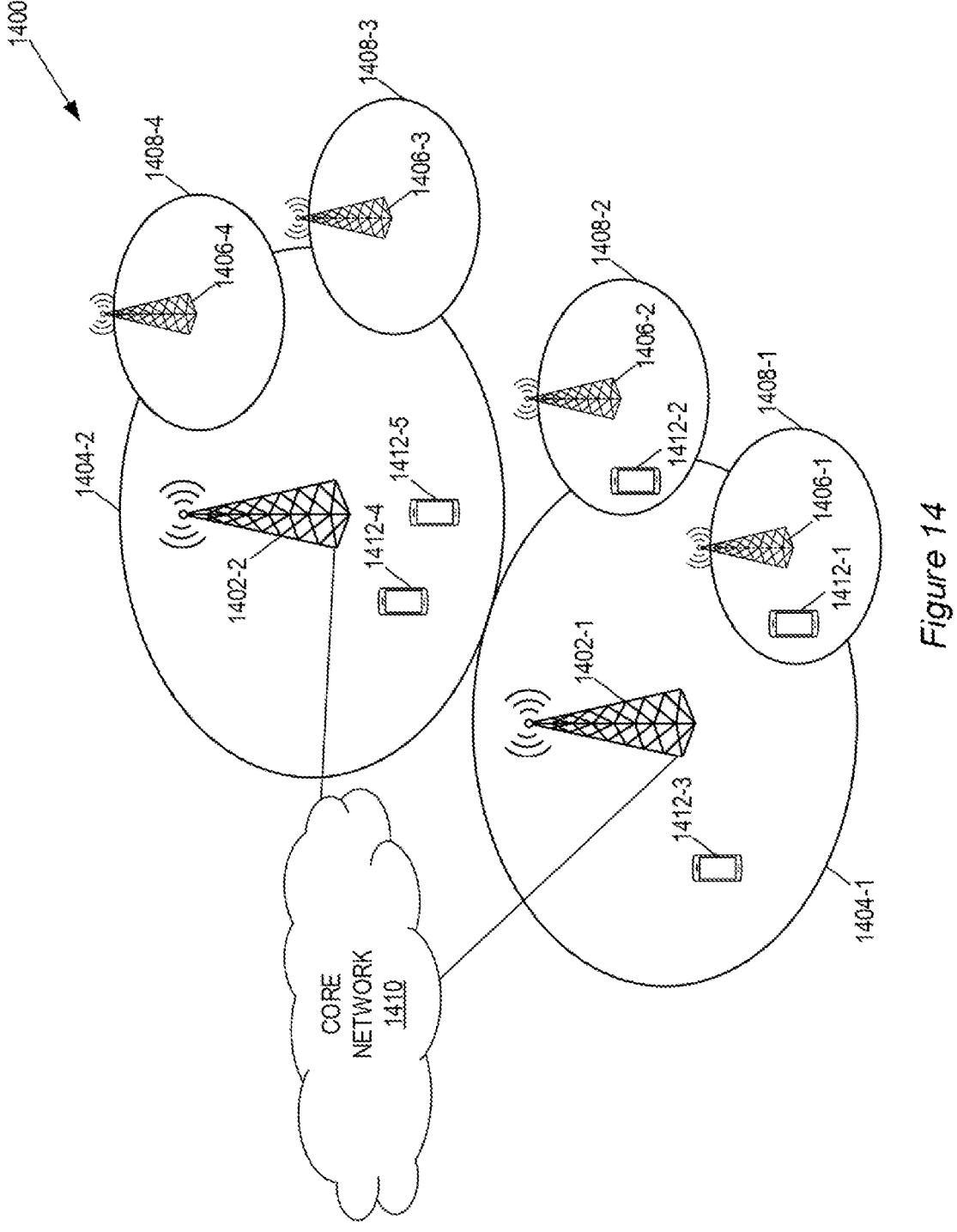
FIG. 14 illustrates an example of a communications network in which embodiments of the present disclosure may be implemented.

FIG. 14 illustrates an example of a communications network (or communications system) 1400 in which embodiments of the present disclosure may be implemented. In the present example, the communication network 1400 is a cellular communication system, such as a 5G system (5GS) including a Next Generation RAN (NG-RAN) (also referred to herein as a NR RAN), an Evolved Packet System (EPS) including an LTE RAN, or the like.

In the present example, the RAN includes base stations 1402-1 and 1402-2, which in the NG-RAN are referred to as gNBs (NR base station) or ng-eNBs (LTE RAN nodes connected to 5GC) and in the LTE RAN are referred to as eNBs, controlling corresponding (macro) cells 1404-1 and 1404-2. The base stations 1402-1 and 1402-2 are generally referred to herein collectively as base stations 1402 and individually as base station 1402. Likewise, the (macro) cells 1404-1 and 1404-2 are generally referred to herein collectively as (macro) cells 1404 and individually as (macro) cell 1404. The RAN may also include a number of low power nodes 1406-1 through 1406-4 controlling corresponding small cells 1408-1 through 1408-4. The low power nodes 1406-1 through 1406-4 can be small base stations (such as pico or femto base stations) or Remote Radio Heads (RRHs), or the like. Notably, while not illustrated, one or more of the small cells 1408-1 through 1408-4 may alternatively be provided by the base stations 1402. The low power nodes 1406-1 through 1406-4 are generally referred to herein collectively as low power nodes 1406 and individually as low power node 1406. Likewise, the small cells 1408-1 through 1408-4 are generally referred to herein collectively as small cells 1408 and individually as small cell 1408. The communications network 1400 also includes a core network 1410, which in the 5GS is referred to as the 5G core (5GC). The base stations 1402 (and optionally the low power nodes 1406) are connected to the core network 1410.

The base stations 1402 and the low power nodes 1406 provide service to wireless communication devices (WCDs) 1412-1 through 1412-5 in the corresponding cells 1404 and 1408. The WCDs 1412-1 through 1412-5 are generally referred to herein collectively as WCDs 1412 and individually as WCD 1412. The WCDs 1412 may for example be UEs, but the present disclosure is not limited thereto. The WCD 1301 described above with reference to FIG. 13 may for example be one of the WCD 1412 in FIG. 14. The network node 1302 described above with reference to FIG. 13 may for example be one of the base stations 1402 or the low power nodes 1406 in FIG. 14.

The methods 1000 and 1100 described above with reference to FIGS. 10-11 represent a first aspect of the present disclosure. The WCD 1301 described above with reference to FIG. 13 represents a second aspect of the present disclosure. The WCD 1301 may for example be configured to perform the method of any of the embodiments (or example implementations) of the first aspect described above. The WCD 1301 may for example be configured to perform the method 1000 described above with reference to FIG. 10 and/or the method 1100 described above with reference to FIG. 11.

The WCD 1301 may for example comprise means configured to cause the WCD 1301 to perform the method of any of the embodiments (or example implementations) of the first aspect described above. It will be appreciated that the WCD 1301 in FIG. 13 need not necessarily comprise all those components described below with reference to FIG. 15.

The WCD 1301 may for example comprise processing circuitry (or one or more processors) configured to cause the WCD 1301 to perform the method of any of the embodiments (or example implementations) of the first aspect described above.

The WCD 1301 may for example comprise processing circuitry (or one or more processors) and a memory, the memory containing instructions executable by the processing circuitry whereby the WCD 1301 is operative to perform the method of any of the embodiments of the first aspect described above.

In some embodiments, a computer program includes instructions which, when executed by processing circuitry (or one or more processors), cause the processing circuitry to carry out the functionality of the WCD 1301 according to the method of any of the embodiments (or example implementations) of the first aspect described above.

In some embodiments, a carrier comprises the aforementioned computer program. The carrier is one of an electronic signal, an optical signal, a radio signal, or a computer readable storage medium (for example a non-transitory computer readable medium such as memory).

Figure 15:
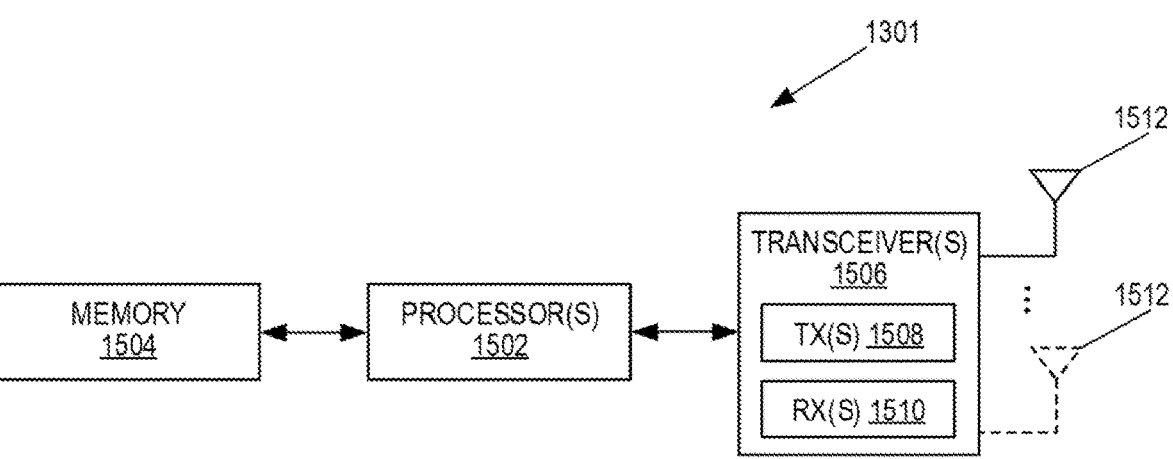
FIG. 15 is a schematic block diagram of a WCD, according to some embodiments.

FIG. 15 is a schematic block diagram of a WCD 1301 according to some embodiments of the present disclosure. As illustrated, the WCD 1301 includes one or more processors 1502 (for example Central Processing Units (CPUs), Application Specific Integrated Circuits (ASICs), Field Programmable Gate Arrays (FPGAs), and/or the like), one or more memories 1504 (for example Read Only Memories (ROMs), Random Access Memories (RAMs), cache memories, flash memory devices, optical storage devices, and/or the like), and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by those of ordinary skill in the art. The processor(s) 1502 is also referred to herein as processing circuitry. The transceiver(s) 1506 is also referred to herein as radio circuitry. In some embodiments, the functionality of the WCD 1301 described above may be fully or partially implemented in software (that is, for example stored in the memory 1504 and executed by the processor(s) 1502). Note that the WCD 1301 may include additional components not illustrated in FIG. 15 such as, for example, one or more user interface components (for example an input/output interface including a display, buttons, a touch screen, a microphone, a speaker(s), and/or the like and/or any other components for allowing input of information into the WCD 1301 and/or allowing output of information from the WCD 1301), a power supply (for example a battery and associated power circuitry), etc.

The method 1200 described above with reference to FIG. 12 represents a third aspect of the present disclosure. The network node 1302 described above with reference to FIG. 13 represents a fourth aspect of the present disclosure. The network node 1302 may for example be configured to perform the method of any of the embodiments of the third aspect described above. The network node 1302 may for example be configured to perform the method 1200 described above with reference to FIG. 12.

The network node 1302 may for example comprise means configured to cause the network node 1302 to perform the method of any of the embodiments (or example implementations) of the third aspect described above. It will be appreciated that the network node 1302 in FIG. 13 need not necessarily comprise all those components described below with reference to FIGS. 16-17.

The network node 1302 may for example comprise processing circuitry (or one or more processors) configured to cause the network node 1302 to perform the method of any of the embodiments (or example implementations) of the third aspect described above.

The network node 1302 may for example comprise processing circuitry (or one or more processors) and a memory, the memory containing instructions executable by the processing circuitry whereby the network node 1302 is operative to perform the method of any of the embodiments of the third aspect described above.

In some embodiments, a computer program includes instructions which, when executed by processing circuitry (or one or more processors), cause the processing circuitry to carry out the functionality of the network node 1302 according to the method of any of the embodiments (or example implementations) of the third aspect described above.

In some embodiments, a carrier comprises the aforementioned computer program. The carrier is one of an electronic signal, an optical signal, a radio signal, or a computer readable storage medium (for example a non-transitory computer readable medium such as memory).

Figure 16:
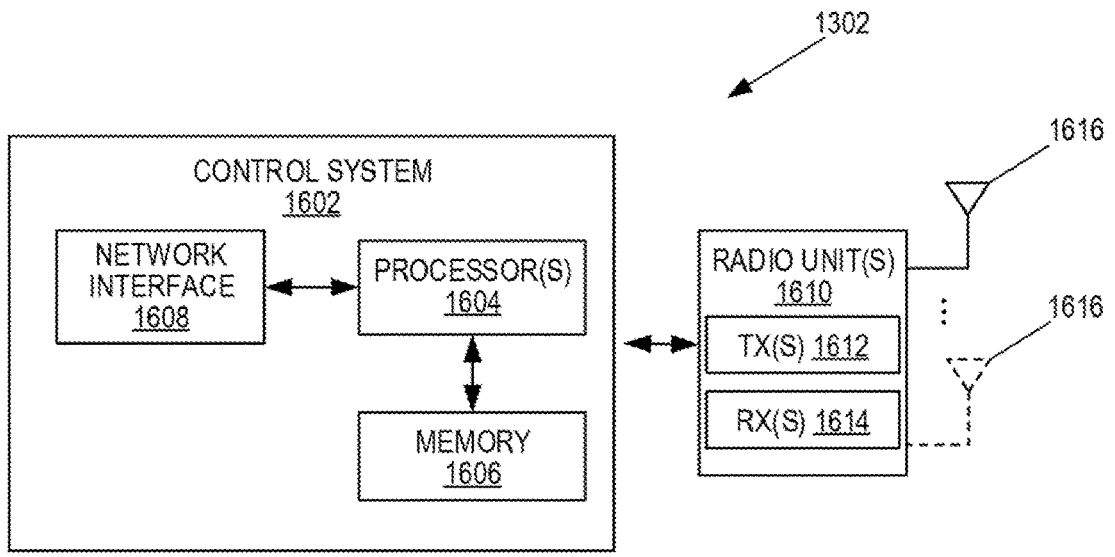
FIG. 16 is a schematic block diagram of a network node, according to some embodiments.

FIG. 16 is a schematic block diagram of a network node 1302 according to some embodiments of the present disclosure. The network node 1302 may be, for example, a base station 1402 or 1406 or a network node that implements all or part of the functionality of a base station. As illustrated, the network node 1302 includes a control system 1602 that includes one or more processors 1604 (for example CPUs, ASICs, FPGAs, and/or the like), one or more memories 1606 (for example ROMs, RAMs, cache memories, flash memory devices, optical storage devices, and/or the like), and a network interface 1608. The one or more processors 1604 are also referred to herein as processing circuitry. In addition, the network node 1302 includes one or more radio units 1610 that each includes one or more transmitters 1612 and one or more receivers 1614 coupled to one or more antennas 1616. The radio unit(s) 1610 may be referred to or be part of radio interface circuitry. In some embodiments, the radio unit(s) 1610 is external to the control system 1602 and connected to the control system 1602 via, for example, a wired connection (for example, an optical cable). However, in some other embodiments, the radio unit(s) 1610 and potentially the antenna(s) 1616 are integrated together with the control system 1602. The one or more processors 1604 operate to provide one or more functions of a network node 1302 as described herein (for example, one or more functions of a network node described above with reference to FIGS. 12 and 13). In some embodiments, the function(s) are implemented in software that is stored, for example, in the memory 1606 and executed by the one or more processors 1604.

Figure 17:
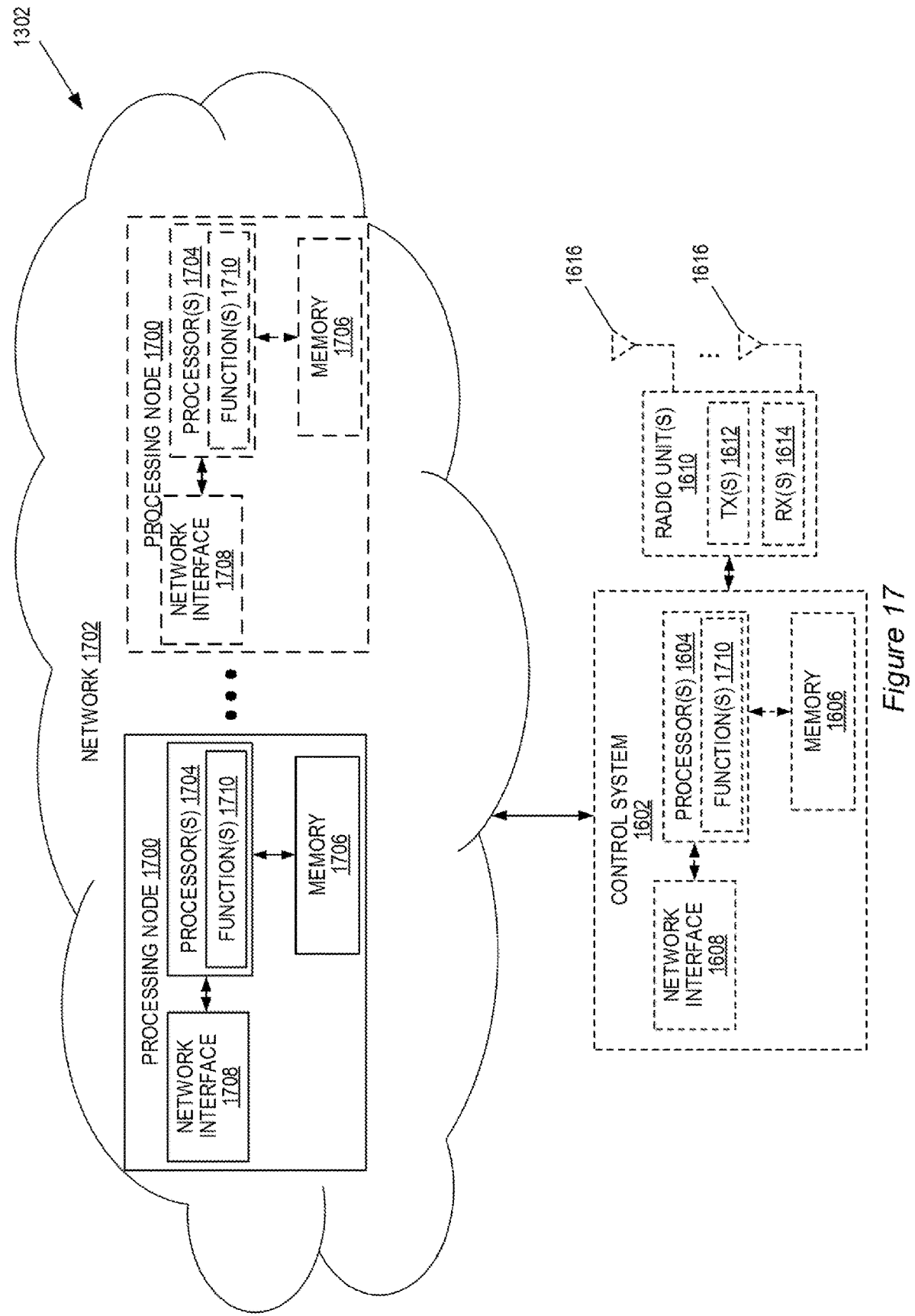
FIG. 17 is a schematic block diagram that illustrates a virtualized embodiment of a network node.

FIG. 17 is a schematic block diagram that illustrates a virtualized embodiment of the network node 1302 according to some embodiments of the present disclosure. As used herein, a "virtualized" network node is an implementation of the network node 1302 in which at least a portion of the functionality of the network node 1302 is implemented as a virtual component(s) (for example via a virtual machine(s) executing on a physical processing node(s) in a network(s)). As illustrated, in this example, the network node 1302 includes one or more processing nodes 1700 coupled to or included as part of a network(s) 1702. Each processing node 1700 includes one or more processors 1704 (for example, CPUs, ASICs, FPGAs, and/or the like), one or more memories 1706 (for example ROMs, RAMs, cache memories, flash memory devices, optical storage devices, and/or the like), and a network interface 1708. The network node 1302 may include the control system 1602 and/or the one or more radio units 1610, as described above. If present, the control system 1602 or the radio unit(s) 1610 are connected to the processing node(s) 1700 via the network 1702.

In this example, functions 1710 of the network node 1302 described herein (for example one or more functions of a network node described above with reference to FIGS. 12 and 13) are implemented at the one or more processing nodes 1700 or distributed across the one or more processing nodes 1700 and the control system 1602 and/or the radio unit(s) 1610 in any desired manner. In some particular embodiments, some or all of the functions 1710 of the network node 1302 described herein are implemented as virtual components executed by one or more virtual machines implemented in a virtual environment(s) hosted by the processing node(s) 1700.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

REFERENCES

[1] RP-193252, New Work Item on NR small data transmissions in INACTIVE state, ZTE Corporation, 3GPP TSG RAN Meeting #86, Sitges, Spain, Dec. 9-12, 2019.

The invention claimed is:

1. A method at a wireless communication device, WCD, the method comprising:
  receiving a conditional message from a network node in a communication network, the conditional message comprising:
    a radio resource control, RRC, release message;
    an information element, IE; and
    a condition in the IE of the conditional message regarding when to use the IE; and
  responsive to receiving the conditional message, saving a user equipment, UE, context of the WCD; and
  applying the received conditional message to trigger the WCD to one or both:
    wait to transition from a connected state to an inactive state until a first condition in the IE is satisfied; and
    remain, without transition, in an inactive state after a second condition in the IE is satisfied.

2. The method of claim 1, wherein the UE context of the WCD is a UE Inactive Access Stratum, AS, context.

3. The method of claim 1, further comprising:
  after receiving the conditional message and while the WCD is in the inactive state, detecting a synchronization signal from a cell in the communication network; and
  after detecting the synchronization signal, using the saved UE context of the WCD to transmit data to the communication network.

4. The method of claim 3, wherein the data is transmitted while the WCD is in the inactive state.

5. The method of claim 3, wherein the data is transmitted in a message 3 of a four-step random access procedure, or in a message A of a two-step random access procedure.

6. The method of claim 3, wherein the conditional message is transmitted via a first cell served by the network node, wherein the data is transmitted in uplink resources which were configured via the first cell while the WCD was in the connected state.

7. The method of claim 6, wherein one or both:

the synchronization signal is received via the first cell; and the data is transmitted via the first cell.

8. The method of claim 1, further-comprising:

responsive to receiving the conditional message and while the WCD is in the inactive state:

detecting a synchronization signal from a cell in the communication network; and after detecting the synchronization signal, using the saved UE context of the WCD to connect to the cell.

9. The method of claim 1, wherein one or both of the first and second condition involve use of a timer, and wherein a duration of the timer is:

indicated in the IE; or indicated in another conditional message transmitted to the WCD; or predefined at the WCD.

10. A wireless communication device (WCD), comprising:

processing circuitry configured to cause the WCD to:

receive a conditional message from a network node in a communication network, the conditional message comprising:

a radio resource control, RRC, release message;

an information element, IE; and a condition in the IE of the conditional message regarding when to use the IE;

responsive to receiving the conditional message, save a user equipment, UE, context of the WCD; and apply the received conditional message to trigger the WCD to one or both:

wait to transition from a connected state to an inactive state until a first condition in the IE is satisfied; and remain, without transition, in an inactive state after a second condition in the IE is satisfied.

11. A method at a network node in a communication network, the method comprising:

transmitting a conditional message to a wireless communication device (WCD), the conditional message indicating that the WCD is to save a user equipment (UE) context of the WCD, the conditional message comprising:

a radio resource control, RRC, release message;

an information element, IE; and a condition in the IE of the conditional message regarding when to use the IE; and applying the conditional message to trigger the WCD to one or both:

wait to transition from a connected state to an inactive state until a first condition in the IE is satisfied; and remain, without transition, in an inactive state after a second condition in the IE is satisfied.

12. The method of claim 11, further comprising:

after transmitting the conditional message and while the WCD is in the inactive state, transmitting a synchronization signal via a cell in the communication network; and after transmitting the synchronization signal, using the saved UE context of the WCD to receive data from the WCD.

13. The method of claim 12, wherein the data is received in a message 3 of a four-step random access procedure, or in a message A of a two-step random access procedure.

14. The method of claim 12, wherein the conditional message is transmitted via a first cell served by the network node, and wherein the data is received in uplink resources which were configured via the first cell while the WCD was in the connected state.

15. The method of claim 11, wherein the conditional message indicates that the WCD is to:

remain in the inactive state instead of transitioning to the idle state if the second condition is satisfied.

16. The method of claim 11, wherein the conditional message indicates one or more parameters for one or both of encryption and context fetching, to be used by the WCD for a future resumption of connection.

17. A network node for operation in a communication network, the network node comprising processing circuitry configured to cause the network node to:

transmit a conditional message to a wireless communication device (WCD), the conditional message indicating that the WCD is to save a user equipment (UE) context of the WCD, the conditional message comprising:

a radio resource control, RRC, release message;

an information element, IE; and a condition in the IE of the conditional message regarding when to use the IE; and apply the conditional message to trigger the WCD to one or both:

wait to transition from a connected state to an inactive state until a first condition in the IE is satisfied; and remain, without transition, in an inactive state after a second condition in the IE is satisfied.

* * * * *